United States Patent
Tashkin

(10) Patent No.: US 11,755,970 B2
(45) Date of Patent: Sep. 12, 2023

(54) SYSTEMS AND METHODS FOR GENERATING CONSTRUCTION ASSIGNMENT SCHEDULES HAVING MULTI-TASK CONSTRUCTION PROJECTS

(71) Applicant: Katerra, Menlo Park, CA (US)

(72) Inventor: Corey Tashkin, Tampa, FL (US)

(73) Assignee: BFS Operations LLC, Dallas, TX (US)

( * ) Notice: Subject to any disclaimer, the term of this patent is extended or adjusted under 35 U.S.C. 154(b) by 0 days.

(21) Appl. No.: 17/246,128

(22) Filed: Apr. 30, 2021

(65) Prior Publication Data

US 2021/0350310 A1 Nov. 11, 2021

Related U.S. Application Data

(60) Provisional application No. 63/073,609, filed on Sep. 2, 2020, provisional application No. 63/018,179, filed on Apr. 30, 2020.

(51) Int. Cl.
| | |
|---|---|
| *G06Q 10/00* | (2023.01) |
| *G06Q 10/0631* | (2023.01) |
| *G06F 3/0482* | (2013.01) |
| *G06Q 10/1093* | (2023.01) |
| *G06Q 10/0639* | (2023.01) |

(52) U.S. Cl.
CPC ... *G06Q 10/063118* (2013.01); *G06F 3/0482* (2013.01); *G06Q 10/06398* (2013.01); *G06Q 10/063112* (2013.01); *G06Q 10/1097* (2013.01)

(58) Field of Classification Search
None
See application file for complete search history.

(56) References Cited

U.S. PATENT DOCUMENTS

| | | |
|---|---|---|
| 7,330,821 B2 | 2/2008 | Wares |
| 8,788,590 B2 | 7/2014 | Culver |
| 9,679,038 B2 | 6/2017 | Omansky |
| 11,481,702 B1* | 10/2022 | Uriarte ........... G06Q 10/063118 |
| 2004/0205206 A1* | 10/2004 | Naik .................. H04L 67/1095 |
| | | 709/230 |
| 2006/0010005 A1 | 1/2006 | Rowland |

(Continued)

OTHER PUBLICATIONS

Harrin, Elizabeth, 5 Benefits of Assigning Tasks on Your Schedule, Mar. 22, 2019, PMTips.net, https://pmtips.net/article/5-benefits-of-assigning-tasks-on-your-schedule, p. 1-9. (Year: 2019).*

*Primary Examiner* — Joseph M Waesco
(74) *Attorney, Agent, or Firm* — Armstrong LLP

(57) ABSTRACT

Methods and systems to generate a work schedule for a multi-task project include storing, in a memory, a task code and a labor requirement for each task of the multi-task project. The methods and systems also include building, by a processor, a task schedule for the multi-task project. The task schedule includes labor hours, a projected time frame, and worker roles for each task. The methods and systems further include retrieving, by the processor, availability data for workers qualified for the worker roles of each task. The availability data for each worker includes an availability status and a geographic location. The methods and systems also include building, by the processor, the work schedule by assigning workers to job orders based on the task schedule, the worker availabilities, the geographic locations, and the project location.

17 Claims, 29 Drawing Sheets

(56) References Cited

U.S. PATENT DOCUMENTS

| | | | |
|---|---|---|---|
| 2007/0061774 A1* | 3/2007 | Chan | G06F 8/20 717/103 |
| 2008/0015823 A1 | 1/2008 | Arnold | |
| 2008/0288539 A1* | 11/2008 | Jacobs | G06Q 10/02 |
| 2009/0124394 A1* | 5/2009 | Swarna | G06F 8/65 463/43 |
| 2010/0185547 A1 | 7/2010 | Scholar | |
| 2010/0257015 A1* | 10/2010 | Molander | G06Q 10/06 707/E17.014 |
| 2012/0078924 A1* | 3/2012 | Woodings | G06Q 10/063112 707/754 |
| 2013/0338970 A1 | 12/2013 | Reghetti | |
| 2014/0236656 A1* | 8/2014 | Nielsen | G06Q 10/0633 705/7.17 |
| 2014/0365533 A1* | 12/2014 | Debray | G06F 16/2228 707/803 |
| 2015/0081363 A1* | 3/2015 | Taylor | G06Q 40/00 705/7.14 |
| 2015/0234377 A1* | 8/2015 | Mizikovsky | G06F 30/13 700/98 |
| 2015/0242979 A1* | 8/2015 | Abts | G06Q 50/2057 705/328 |
| 2016/0048785 A1* | 2/2016 | Dommarajukrishnamaraju | G06Q 10/06313 705/7.23 |
| 2016/0140504 A1* | 5/2016 | Obeid | G06Q 10/1053 705/321 |
| 2016/0188369 A1* | 6/2016 | Moloian | G06F 16/283 718/104 |
| 2016/0253640 A1* | 9/2016 | Allin | G06Q 30/00 705/40 |
| 2016/0294621 A1* | 10/2016 | Werth | H04M 3/5191 |
| 2017/0243144 A1* | 8/2017 | Nielsen | G06Q 10/0633 |
| 2017/0278026 A1* | 9/2017 | Nielsen | G06Q 10/063 |
| 2018/0096274 A1* | 4/2018 | DeZeeuw | G06Q 10/06315 |
| 2019/0057354 A1* | 2/2019 | McKenzie | G06Q 50/08 |
| 2020/0019907 A1* | 1/2020 | Notani | G06Q 10/063116 |
| 2020/0134745 A1* | 4/2020 | McLinden | G06Q 10/06313 |
| 2022/0114554 A1* | 4/2022 | Ogawa | G06Q 10/063114 |
| 2022/0351109 A1* | 11/2022 | Woods | G06Q 10/06313 |

\* cited by examiner

FIG. 8

| Display | ↓ | Contractor | Job Order Status | Department | Project Contact | Account Manager |
|---|---|---|---|---|---|---|
| Department: Self-Perform General Labor | | | | | | |
| ☐ Gc (23505) | | Katerra Construction | Open | Self-Perform General Labor | John Smith 88888 | John Smith 88888 |
| Department: Self-Perform-Finish Trim | | | | | | |
| ☐ Finish Carpentry (26605) | | Katerra Construction | Open | Self-Perform-Finish Trim | John Smith 88888 | John Smith 88888 |
| Department: Self-Perform-Plumbing | | | | | | |
| ☐ Plumbing (22985) | | Katerra Construction | Open | Self-Perform Plumbing | John Smith 88888 | John Smith 88888 |
| Department: UEB | | | | | | |

Project > Lyons Gate

Lyons Gate  P-17-050.1040  Residential  John Smith Construction  Gilbert Arizona 85234

Summary  Contractors  Job Orders  Placements  Estimates  Actuals  LCPR  Comments  Locations  Documents  Notes  Users  Vendors  Wages

| | Job Order | Personnel | Job Title | Placement Status ▽ | Start Date | Personnel End... | Supplie |
|---|---|---|---|---|---|---|---|
| ☐ | Carpentry (21042) | John Smith 88888 | Journeyman | Working | 2/4/2019 | | Kate (T29 |
| ☐ | Carpentry (21042) | John Smith 88888 | Technician | Working | 2/12/2019 | | Kate (T29 |
| Job Order: Concrete (26179) | | | | | | | |
| ☐ | Concrete (25179) | John Smith 88888 | Admin/Clerk | Working | 6/24/2019 | | Kate (T29 |
| Job Order: Drywall (23274) | | | | | | | |
| ☐ | Drywall (23274) | John Smith 88888 | Apprentice | Working | 4/15/2019 | | Kate (T29 |
| ☐ | Drywall (23274) | John Smith 88888 | Journeyman | Working | 1/14/2020 | | Kate (T29 |
| ☐ | Drywall (23274) | John Smith 88888 | Journeyman | Working | 10/20/2019 | | Kate (T29 |

| *Job Order | | Need Date | Source PK | *Time Card Contact |
| --- | --- | --- | --- | --- |
| Lyons - Concrete (26179) ▼ | | 06/24/2019 ▦ | 859245 | "Please Select" ▢ |
| *Supplier | Purchase Order | Placement Status | | Sub status |
| Katerra (Supplier) (72903) ▼ | "Please Select" ▼ | Working ▼ | | "Please Select" ▼ |
| Personnel | Show Date | Personnel End Date | | ☐ Bill Per Diem ☐ Stay in Hotel Separate |
| John Smith 88888 ▢ | 06/24/2019 ▦ | ▦ | | |
| Trade | Department | Job Title | | ☐ Traveling ☐ Is Billable |
| Administrative ▼ | "Please Select" ▼ | Admin/Clerk ▢ | | |
| Wage   Margin % | Daily Per Diem  Hourly Per Diem | Prevailing Wage Title | | Personnel Source |
| $15.00   8.49 | $0.00 | | | Field |
| Rate | Bill Rate   ☐ OT Bill Rate | Fringe | | WC Code   State |
| "Please Select" ▼ | $16.39 ▼   $23.76 | $0.00 | | K 8810   Arizona ▼ |
| Last Dispatch Email Send On | Last Dispatch Email Send By | | ☐ Paid Final Timesheet | |

☐ Delete  ☐ Dispatch  ☐ Update

FIG. 10

| Project ▼ | Lyons Gate ▼ | Job Order ▼ | Plumbing (22985) | | | ✏ Edit |
|---|---|---|---|---|---|---|

Lyons Gate  Plumbing  22985  22985  Job Order  Open

Summary  Add  Applicants  Billing by PD  Hot Prespects  Users  Comments  JDV  Placements  [Task]  Trades Needed

| + Add | 🗑 Delete | ⬚ Export ▼ | ⚙ Default ▼ | 🔍 Search... | ⊘ |
|---|---|---|---|---|---|

Drag a column header and drop it here to group by that column

| ☐ Task | SAP Code | Sort Order | Updated On | Updated By |
|---|---|---|---|---|
| ☐ Plumbing - Undergrounded Piping - 121116-01 | 221116 | 100 | 3/18/2019 10:13 AM | jsmith |
| ☐ Plumbing - Sanitary Waste and Vent Piping - 121316 | 221316 | 100 | 3/18/2019 10:13 AM | jsmith |
| ☐ Plumbing - Hangers and Supports for Plumbing Piping and Equipment - 220529 | 220529 | 100 | 3/25/2019 11:39 AM | jsmith |
| ☐ Plumbing - Facility Stone Drains - 221426 | 221426 | 100 | 3/26/2019 5:25 PM | jsmith |
| ☐ Plumbing - Residential Bathtubs - 224119 | 224119 | 0 | 3/26/2019 5:25 PM | jsmith |
| ☐ Plumbing - Steam and Condensate Piping and Pumps - 232200 | 232200 | 100 | 3/26/2019 5:25 PM | jsmith |
| ☐ Plumbing - Start-up- Test & Inspection - 220000 - 02 | 220000 | 100 | 3/26/2019 5:25 PM | jsmith |
| ☐ Plumbing - Domestic Water (Hot & Cold) Rough in -22116-02 | 221116 | 0 | 3/26/2019 5:25 PM | jsmith |

Project > Lyons Gate

Lyons Gate  P-17-050.1040  Residential  John Smith  Construction  Gilbert Arizona 85234

Summary  Contractors  Job Orders  Placements  Estimates  Actuals  LCPR  Comments  Locations  Documents  Notes  Users  Vendors  Wages ⊕ Add  ⊟ Delete                                                                         ✎ Edit ↑ Division ✕                                                   ⚙ Default ▼    🔍 Search ⊘
⬛ Export ▼

| ☐ | Task | Division | Total Cost | Total Hours | Total Units | Created On | KPI | Created By | Updated On | Updated By |
|---|------|----------|------------|-------------|-------------|------------|-----|------------|------------|------------|
| Division: Concrete | | | | | | | | | | |
| ☐ | Concrete - Safety 030100-03 | Concrete | $0.01 | 0.01 | 1 | 8/8/2019 1:04 PM | | | 8/15/2019 9:38 AM | jsmith |
| Division: Doors, Windows, Glass | | | | | | | | | | |
| ☐ | Doors, Windows, Glass- Hang/Case Doors- 081000-03 | Doors, Windows, Glass | $70,026.00 | 2122 | 3537 | 11/27/2019 10:09 AM | 86% (Cost) 3% (Prod) | jsmith | 11/27/2019 10:09 AM | jsmith |
| Division: DPI | | | | | | | | | | |
| ☐ | DPI - Plaster and Gypsum Board - 097000 | DPI | $551,969.92 | 13799.3 | 20698987 | 7/30/2019 12:17 PM | 65% (Cost) 22% (Prod) | jsmith | 7/30/2019 12:17 PM | jsmith |
| ☐ | Dpi - Interior Painting - 099123 | DPI | $633,440.00 | 15836 | 26 | 1/28/2019 5:50 PM | 6% (Cost) 3% (Prod) | jsmith | 1/28/2019 5:50 PM | jsmith |
| ☐ | DPI - Manufacturing - rework L.O.C. - 807000 | DPI | $0.01 | 0.01 | 1 | 8/16/2019 10:5 AM | 2015568975% (Cost) 189500% (Prod) | jsmith | 8/16/2019 10:45 AM | jsmith |

FIG. 13

Project > LyonsGate > Project Productivity Actual > Edit

Project Productivity Estimated

568 →

Enter Estimates

*Project
Lyons Gate ▼

| ID# | Description/loca... | Estimated Quantity | MHV (Hr/Unit) | Estimated Hours | Burdened Labor Rate (Verify Crew Rate Used) | Estimated Labor Cost | Planned Start Date | Target Date |
|---|---|---|---|---|---|---|---|---|
| DPI - Interior Painting - 099123 + | | | ☐ Allow Overwrite | | | | | |
| | BC Buildings | 3.00 | 744.67 | 2,234.00 | $40.00 | $89,360.00 | | |
| | Garage Buildings | 7.00 | 90.00 | 630.00 | $40.00 | $25,200.00 | | |
| | Clubhouse Buildings | 2.00 | 162.50 | 325.00 | $40.00 | $13,000.00 | | |
| | Trade Lead | 1.00 | 3,167.00 | 3,167.00 | $40.00 | $126,680.00 | | |
| | AC Buildings | 7.00 | 684.86 | 4,794.00 | $40.00 | $191,760.00 | | |
| | BB Buildings | 6.00 | 781.00 | 4,686.00 | $40.00 | $187,440.00 | | |
| | | 26.00 | | 15,836.00 | | $633,440.00 | | |

✓Done

Project > Lyons Gate

Lyons Gate  P-17-050.1040  Residential  John Smith Construction  Gilbert Arizona 85234  ✏️ Edit Summary  Contractors  Job Orders  Placements  Estimates  Actuals  LCPR Comments  Locations  Documents  Notes  Users  Vendors  Wages ⊕ Add  🗑 Delete  ⬚ Export ▼  ⚙️ Default ▼  🔍 Search

| ↕ Division × | | | | | | | |
|---|---|---|---|---|---|---|---|
| | Actual Date | Task ↑ | Total Units | Updated On | Division | Actual Percent Done | Percent Done Over... | Percent Done | Updated By |

Division: Concrete

| | 9/3/2019 | Concrete - Safety 030100-03 | 0 | 9/3/2019 12:28 PM | Concrete | 0.00% | ☐ | | jsmith... |

Division: Doors, Windows, Glass

| | 12/2/2019 | Doors, Windows, Glass-Hang/Case Doors-081000-03 | 50 | 12/2/2019 4:55 AM | Doors, Windows, Glass | 1.41% | ☐ | | jsmith... |
| | 12/20/2019 | Doors, Windows, Glass-Hang/Case Doors-081000-03 | 0 | 12/23/2019 11:55 AM | Doors, Windows, Glass | 1.41% | ☐ | | jsmith... |
| | 1/24/2020 | Doors, Windows, Glass-Hang/Case Doors-081000-03 | 242 | 1/28/2020 7:42 AM | Doors, Windows, Glass | 8.26% | ☐ | | jsmith... |

Project Productivity Actual

Project > LyonsGate > Project Productivity Actual > Edit

572

*Project: Lyons Gate

Enter Actuals

*Actual Date: 11/17/2019

| Code | Description | Total units |
|---|---|---|
| Task:DPI-Interior Painting-099123-SF | | |
| | BC Buildings | 0.00 |
| | Garage Buildings | 0.00 |
| | Clubhouse Buildings | 0.00 |
| | Trade Lead | 0.00 |
| | AC Buildings | 1.00 |
| | BB Buildings | 0.00 |

→Next

Staff Project Hours

| ☐ | Department ▽ | Project ↑ | Project Code | Job Order | Personal | Team | Activity | Total Hours | Week Ending |
|---|---|---|---|---|---|---|---|---|---|
| ☐ | KGD | Administrative | Administrative | KGD Administrative (29300) | jsmith | KGD -IT [RKR] | Admin-IT Support | 35 | 2/2/2020 |
| ☐ | KGD | Administrative | Administrative | KGD Administrative (29300) | jsmith | KGD -IT [RKR] | Admin-IT Support | 46.5 | 1/12/2020 |
| ☐ | KGD | Administrative | Administrative | KGD Administrative (29300) | jsmith | KGD -IT [RKR] | Admin-IT Support | 8 | 12/22/2019 |
| ☐ | KGD | Administrative | Administrative | KGD Administrative (29300) | jsmith | KGD -IT [RKR] | Admin-IT Support | 35.5 | 1/5/2020 |
| ☐ | KGD | Bosch Ban 600 | 5097 | KGD -Post-Tender (Katerra) (29313) | jsmith | KGD -IND BLR | Shop Drawing | 9 | 12/1/2019 |
| ☐ | KGD | Bosch Ban 600 | 5097 | KGD -Post-Tender (Katerra) (29313) | jsmith | KGD -IND BLR | Construction | 0 | 11/10/2019 |
| ☐ | KGD | Bosch Ban 600 | 5097 | KGD -Post-Tender (Katerra) (29313) | jsmith | KGD -IND BLR | Shop Drawing | 30 | 11/17/2019 |
| ☐ | KGD | Bosch Ban 600 | 5097 | Design Coordination (26931) | jsmith | KGD -IND BLR | Design Coordination | 12 | 6/23/2019 |

My Time Sheets

My Time Sheets

| Export ▼ | Add Time Sheet(s) for: | 1 Week × ▼ | | ⊕ Add Time Sheet | | ⚙ Default ▼ | Q Search... ⊘ | |
|---|---|---|---|---|---|---|---|---|

Drag a Column header and drop it here to group by that column

| | Personnal | Week Ending ↓ | Time Sheet Status | Total Time | Submitted By | Approved By | Team |
|---|---|---|---|---|---|---|---|
| ☐ | John Smith 888888 | 2/16/2020 | Pending | 0.00 | | | |
| ☐ | John Smith 888888 | 2/9/2020 | Pending | 0.00 | | | |
| ☐ | John Smith 888888 | 2/2/2020 | Pending | 0.00 | | | |
| ☐ | John Smith 888888 | 1/26/2020 | Pending | 0.00 | | | |
| ☐ | John Smith 888888 | 1/19/2020 | Pending | 0.00 | | | |
| ☐ | John Smith 888888 | 1/12/2020 | Pending | 0.00 | | | |
| ☐ | John Smith 888888 | 1/5/2020 | Pending | 0.00 | | | |
| ☐ | John Smith 888888 | 12/29/2020 | Approved | 0.00 | | | |
| ☐ | John Smith 888888 | 12/22/2020 | Approved | 0.00 | John Smith | | |

| | Personnel | Week Ending | Time Sheet Status |
|---|---|---|---|
| | John Smith 888888 | 2/16/2020 | Pending |

💾 Save | + Add Details | 📋 Copy Last Week | ✕ Close | | | 📤 Submit for Approval

Detail

🗑 Delete | 💾 Save | ⊘ Cancel

↑ Project ✕ | ↑ Job Order ✕ | | | ⚙ Default | ▼ | 🔍 Search... | ⊘

Project: Beaverton Beyond Self Storage

Job Order: GC(27683)

| | Project | Job Order | Task | Location | ✏Mon Feb 10 | ✏Tue Feb 11 | ✏Wed Feb 12 | ✏Thu Feb 13 | ✏Fri Feb 14 | ✏Sat Feb 15 | ✏Sun Feb 16 | Total |
|---|---|---|---|---|---|---|---|---|---|---|---|---|
| ☐ | Beaverton Beyond Self Storage | GC(27683) | UEB - Filed Operations Manager - 01-130 | N/A | 8.00 | 0.00 | 0.00 | 0.00 | 0.00 | 0.00 | 0.00 | 8.00 |
| ☐ | Beaverton Beyond Self Storage | GC(27683) | UEB - Contract Admin - 01-200 | N/A | 0.00 | 8.00 | 0.00 | 5.00 | 3.00 | 0.00 | 0.00 | 8.00 |
| ☐ | Beaverton Beyond Self Storage | GC(27683) | UEB - Assistant Superintendent - 01-230 | N/A | 0.00 | 0.00 | 0.00 | 0.00 | 0.00 | 0.00 | 0.00 | 8.00 |
| ☐ | Beaverton Beyond Self Storage | GC(27683) | UEB - Estimating - Shadow - 01-105 | N/A | 0.00 | 2.00 | 4.00 | 0.00 | 3.00 | 0.00 | 0.00 | 8.00 |
| ☑ | Beaverton Beyond Self Storage | GC(27683) | UEB - Asst. Superintendent2 - 01-235 | N/A | 1.00 | 0.00 | 0.00 | 0.00 | 0.00 | 0.00 | 0.00 | 8.00 |

FIG. 20

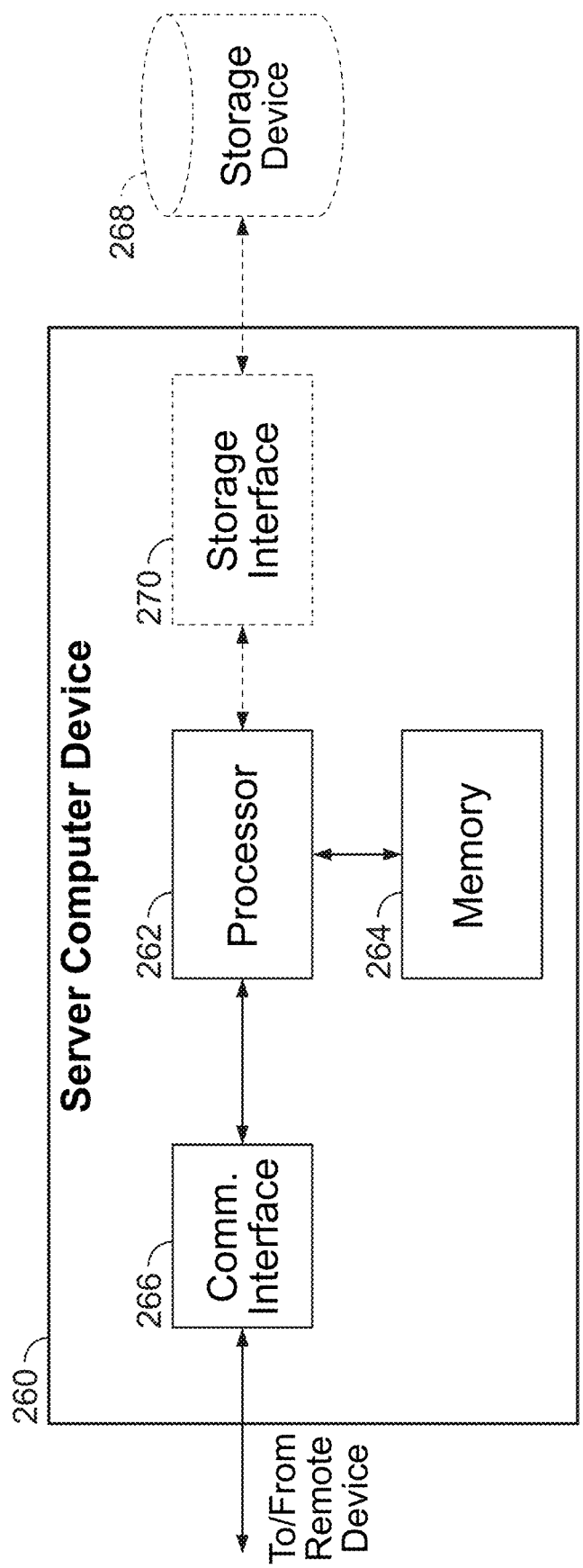

SYSTEMS AND METHODS FOR GENERATING CONSTRUCTION ASSIGNMENT SCHEDULES HAVING MULTI-TASK CONSTRUCTION PROJECTS

CROSS-REFERENCE TO RELATED APPLICATIONS

This application claims priority to U.S. Provisional Application No. 63/018,179, filed Apr. 30, 2020 and U.S. Provisional Application No. 63/073,609, filed Sep. 2, 2020, the contents of which are incorporated herein by reference in their entirety.

BACKGROUND

The disclosure relates generally to multi-task construction projects, and more specifically to network-based systems and methods for generating construction assignment schedules using task data, project location, and/or worker availability and qualification data.

In the construction industry, projects include numerous tasks that must be completed competently and in a timely manner. Each task may involve several construction activities that require differing levels of skill to be completed properly. For example, typical building construction projects include activities such as site work, foundations, structural support, concrete, building envelope, mechanicals, electricals, flooring, plumbing, and roofing. Accordingly, each project requires workers with different skills and qualifications to perform the different activities. Moreover, the construction activities must be performed in a carefully coordinated manner because the activities are performed within the same space and some of the activities are dependent upon the completion of other construction activities. In addition, variables such as weather, financing, human errors, and product shipping times can affect the timing and completion of the construction activities.

At least some multi-task projects utilize a project schedule to coordinate tasks. The project schedules may include tasks for the project and relationships between the tasks. However, the project schedules only include generic task information that is input when the schedule is generated and typically do not include information on the labor that will be required to perform the tasks and may not include other relevant task information. In addition, the project schedules may be difficult to update because any task information and relationships between the tasks must be manually changed any time a variable for the project changes. Typical project schedules are updated on a periodic basis such as weekly, monthly, or yearly based on information that is received during the period since the last update. Accordingly, the project schedules may not be complete, updated, or accurate at any given time during the project. Moreover, the project schedules do not provide information on worker assignments.

For at least some construction projects, workers are assigned to a project based on a request by a superintendent, manager, director, etc. at the jobsite. The superintendents may use the project schedule, their own intuition, observations at the job site, experience, or other information to estimate the number of workers needed to complete upcoming activities within a set time frame, such as a week. The superintendent may submit a request to have the workers assigned to the project for the time frame. Such worker assignment requests vary based on the superintendent, status of the project, or other variables. In addition, a superintendent and the personnel manager may not know if workers will be available at the project location and possess the skills necessary to complete the scheduled activities when the request is generated. Moreover, such a reactive approach does not consider the resource allocation of other multi-task projects and it may be difficult to manage worker demand for multiple multi-task projects.

Accordingly, there is a need for systems and methods to generate worker assignment schedules for multi-task construction projects that utilize real-time data for tasks, project location, and/or worker availability and qualifications.

BRIEF DESCRIPTION

In one aspect, a construction scheduler for a multi-task construction project includes at least one processor in communication with at least one memory device. The at least one processor is programmed to store, in the memory, a task code and a workforce requirement for each task of the multi-task construction project. The task code relates each task to at least one construction activity. The at least one processor is also programmed to build a task schedule for the multi-task construction project. The task schedule includes for each task workhours, a projected time frame, and functions. The at least one processor is also configured to generate job orders based on the task schedule. Each task is associated with at least one job order. The at least one processor is further configured to retrieve availability data for persons qualified for the functions of each task. The availability data for each person includes an availability status and a geographic location. The at least one processor is also configured to build the work schedule by assigning persons to the job orders based on the task schedule, the availabilities, the geographic locations, and the project location. The at least one processor is further configured to output the construction schedule to a user interface configured to receive input related to the construction schedule from a user.

In another aspect, a method for generating a work schedule for a multi-task construction project using a construction work scheduling (CWS) computing device having a processor in communication with a memory includes storing, in a memory, a task code and a labor requirement for each task of the multi-task project. The task code relates each task to at least one construction activity. The method also includes building, by the processor, a task schedule for the multi-task project. The task schedule includes labor hours, a projected time frame, and worker roles for each task. The method further includes generating, by the processor, job orders based on the task schedule, wherein each task is associated with at least one job order, and retrieving, by the processor, availability data for workers qualified for the worker roles of each task. The availability data for each worker includes an availability status and a worker geographic location. The method also includes building, by the processor, the work schedule by assigning workers to the job orders based on the task schedule, the worker availabilities, the worker locations, and the project location.

In another aspect, a system to assign workers to a multi-task project including tasks and a project location includes at least one processor in communication with at least one memory. The at least one processor is programmed to determine qualification criteria for each task of the multi-task project, generate a placement request based on the project location and the qualification criteria associated with each task, and access a database of workers. Each worker in the database is associated with a worker identification code, a worker location, a trade skill, and an availability status. The at least one processor is also programmed to identify at least one worker in the database for at least one task based on the project location, the qualification criteria, and the availability status of the worker. The at least one worker is identified by comparing the trade skill of the worker to the qualification criteria of the task, comparing the worker location of the worker to the project location, and determining if the worker is available for assignment based on the availability status of the worker. The at least one processor is further programmed to assign the at least one worker to a job order by associating the worker identification code and a task code for the task with the job order. The at least one processor is also programmed to store performance data for the at least one worker assigned to the task. The performance data is associated with the worker identification code and the task code.

BRIEF DESCRIPTION OF THE DRAWINGS

FIG. 8 is an illustration of a "Job Order" window of the user interface shown in FIG. 5.

FIG. 9 is an illustration of a "Placements" window of the user interface shown in FIG. 5.

FIG. 10 is an illustration of a "Job Order Placement" window of the user interface shown in FIG. 5.

FIG. 11 is an illustration of a "Task" window of the user interface shown in FIG. 5.

FIG. 12 is an illustration of a "Placements" window of the user interface shown in FIG. 5, and including a geographical map.

FIG. 13 is an illustration of an "Estimates" window of the user interface shown in FIG. 5.

FIG. 14 is an illustration of a "Project Productivity Estimate" window of the user interface shown in FIG. 5.

FIG. 15 is an illustration of an "Actual Data" window of the user interface shown in FIG. 5.

FIG. 16 is an illustration of a "Project Productivity Actual" window of the user interface shown in FIG. 5.

FIG. 17 is an illustration of a "Staff Project Hours" window of the user interface shown in FIG. 5.

FIG. 18 is an illustration of a "Project" window of the user interface shown in FIG. 5 with a reporting drop down menu.

FIG. 19 is an illustration of a "My Time Sheet" window of the user interface shown in FIG. 5.

FIG. 20 is an illustration of a "Time Entry" window of the user interface shown in FIG. 5.

FIG. 22 is an illustration of a "Project" window of the user interface shown in FIG. 5, including a geographical map and a task status field.

FIG. 28 is a simplified block diagram of an exemplary configuration of a server shown in FIG. 26.

Figure 1:
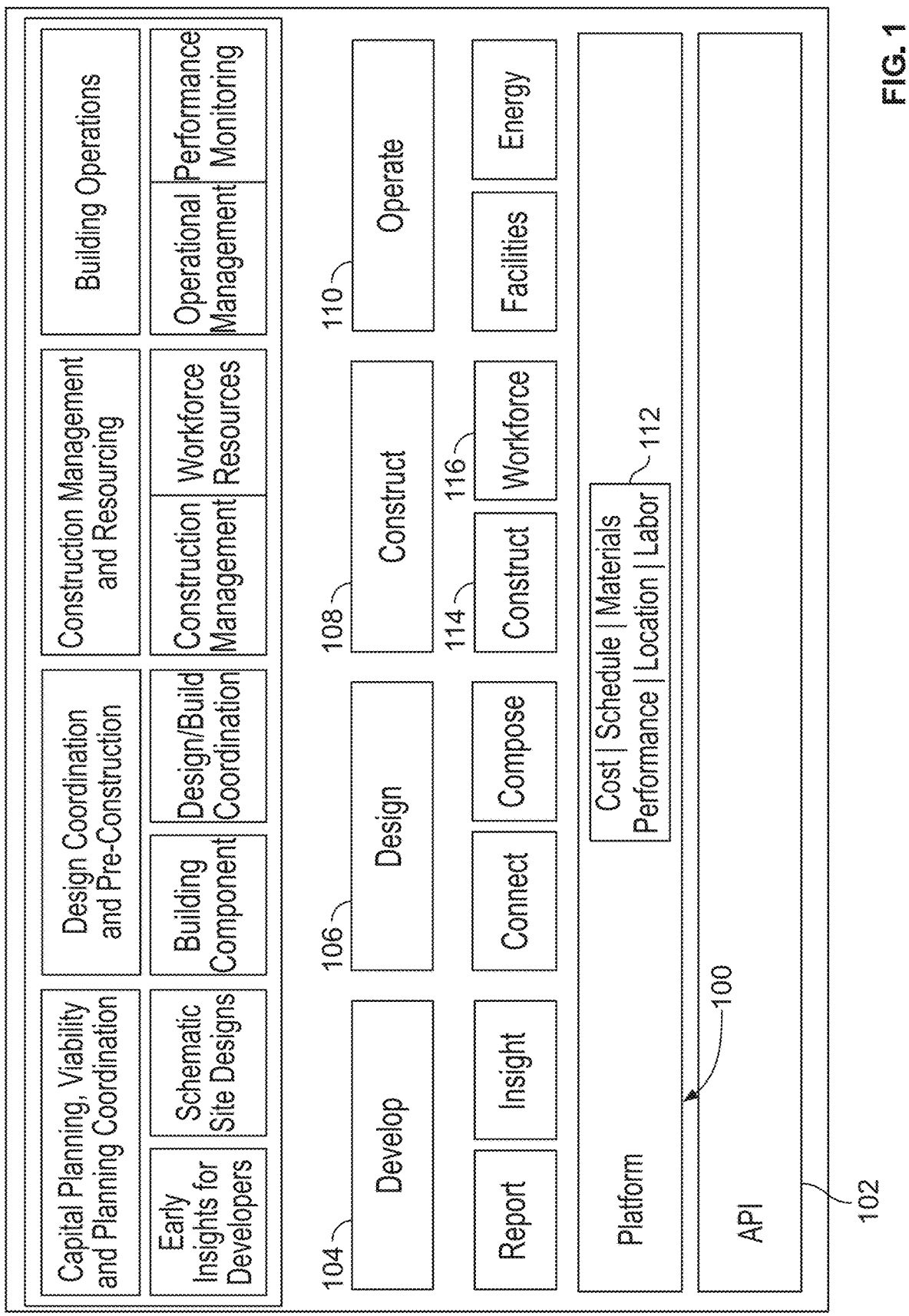
FIG. 1 is a schematic block diagram of a platform for use with multi-task projects.

The Figures depict embodiments for purposes of illustration only. One skilled in the art will readily recognize from the following discussion that other embodiments of the systems and methods illustrated herein may be employed without departing from the scope of the disclosure.

DETAILED DESCRIPTION

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

The systems and methods described in this present disclosure include a multi-task project ("MTP") platform including a work scheduling ("WS") system configured to generate a worker assignment schedule for multi-task projects. The WS system includes multiple computing devices in network communication with one another. Specifically, the WS system includes a work scheduling ("WS") computing device, sometimes referred to as a WS server, that includes at least one processor and a memory in communication with a database. The MTP platform also includes several third party computing devices that are in communication with the WS server. Embodiments of a MTP platform, a WS system, a WS computing, and third party computing devices are shown, for example, in FIGS. 1-3 and 26-28.

The WS system builds the worker assignment schedule from work schedule data that includes labor hours, a projected time frame, and worker roles for each task of the multi-task project. In the worker assignment schedule, the WS server assigns workers to roles for each task of the multi-task project based on the worker availability and the worker location. The WS server assigns qualified workers to the worker roles and verifies that the workers are available for the time frame of the task. The WS server outputs the worker assignment schedule to the WS computing device and/or a user interface. In addition, the WS system enables performance data to be tracked for each worker and task. In some embodiments, the described systems and methods provide regular (e.g., daily) reports or alerts to users based on the worker assignment schedule and/or performance data.

The systems and methods described herein enable the WS computing device and/or third party computing devices to access and/or store data in a database. For example, the database may include workers and each worker in the database may be associated with worker data including a worker identification code, a worker location, a trade skill, and an availability status. The WS server and/or the third party computing devices may compare the worker data and the project data to facilitate the generation of the worker assignment schedule.

In addition, the WS system may update the worker availability and worker location in real-time because the database receives updates from input systems that correlate individual workers to locations and status. For example, the WS server may receive the worker data from mobile devices that are correlated with the workers. For example, the workers may input time entries or other data in an application that sends data to the WS system and the WS system automatically updates the worker availability and/or worker location data.

Also, in the systems and methods described herein, the WS server may generate a geographical map including the project location and locations of available workers. For example, the WS system determines the project location from project data that is provided by the user, stored in the database, and/or determined from data accessed by the WS server. The WS system correlates the project data and the worker location data to geographic locations using geospatial data such as latitudes, longitudes, coordinates, landmarks, survey data, and/or any other geographical data. Also, the WS system builds a map depicting the areas around the projection location and the worker location and indicates the project location and the worker location on the map. The WS system then outputs the geographical map to a computing device and/or a user interface. The geographical map facilitates determining the proximity of workers to the project. In addition, the geographical map may allow for the determination of "hot spots" or "cold spots", i.e., areas where there are a number of workers or projects is greater (hot) or less (cold) than a threshold value. The geographical map may be color coded or include visual imagery to facilitate quick interpretation by the user.

Moreover, the WS server processes the worker assignment data outputted by the WS computing device and determines if additional action is required. For example, the WS server may compare the task data and the assigned worker data to see if any roles have not been filled with workers. The WS system may output the worker assignment schedule and a list of unassigned roles to facilitate the recruitment or identification of potential workers for the unassigned roles in the worker assignment schedule. The WS system may provide alerts when there are one or more unassigned roles in the worker assignment schedule and/or when there are changes in the availability and/or location data for at least one worker in the worker assignment schedule. In addition, the WS system may search the worker database and/or other worker sources such as online job websites to locate potential workers. The WS system may send notifications to the user, to the potential workers, and/or to third-parties informing them of roles in the worker assignment schedule.

At least one of the technical problems addressed by this system may include: (i) improving availability of task assignment data that comes from multiple sources in different applications and systems; (ii) identifying workers for a multi-task project before the project begins using task specific criteria; (iii) timely identifying and providing data regarding unassigned roles in multi-task projects; (iv) providing reliable data regarding the multi-task project for workforce and task decisions; (v) enabling tracking of performance data for workers and tasks; (vi) relating the project location to locations of available workers in a manner that is simple to interpret and utilize; (vii) improving project estimates and forecasts which may be inaccurate because relevant data may not be available to estimating systems and applications; (viii) enabling accurate management and forecasting for multi-task projects which may not share data on similar tasks and a shared worker pool in an easily accessible manner; (ix) improving work assignment schedules by enabling individual workers to be assigned to roles; (x) improving bandwidth of multi-task construction platforms by enabling the platforms to rely on construction data that is stored in a single file; (xi) improving data utilization and storage for multi-task construction project platforms; and/or (xii) improving reports and data output from platforms by providing more robust and up-to-date data.

Exemplary technical effects of the systems and methods described herein may include, for example: (a) receiving and processing task assignment data for multi-task projects using task codes; (b) identifying available workers for a multi-task project based on location, availability, and qualification criteria; (c) sending alerts regarding unassigned roles in multi-task projects; (d) providing real-time updates on workforce and task data using a common database that continuously tracks data through the multi-task project using task codes and worker identification codes; (e) tracking performance data for individual workers and tasks of multi-task projects using task codes and worker identification codes; (f) providing geographic maps that associate locations of available workers to project locations; (g) increasing the accuracy and reliability of project forecasting and estimating by utilizing a common stream of data for multiple applications and systems; (h) enabling forecasting of worker demand across one or more multi-task projects by tracking individual worker assignments and sharing data across the multi-task projects; (i) generating worker assignment schedules with individual workers assigned to appropriate roles by assigning workers based on their locations and qualifications; (j) increasing bandwidth of multi-task construction project platforms by distributing and streamlining processing of construction data; (k) improving data utilization and storage for multi-task construction project platforms by distributing data storage and providing multiple systems and applications access to a single data source; and/or (l) improving reports and data output from multi-task construction project platforms by providing access to more robust data throughout all phases of the construction project.

The methods and systems described herein may be implemented using computer programming or engineering techniques including computer software, firmware, hardware, or any combination or subset thereof, wherein the technical effects may be achieved by performing at least one of the following steps: (a) storing, in a memory, a task code and a labor requirement for each task of a multi-task construction project; (b) building, by a processor, a task schedule for the multi-task construction project; (c) retrieving, by the processor, availability data for workers qualified for the worker roles of each task; (d) building, by the processor, the work schedule by assigning workers to the roles for each task of the multi-task construction project based on the task schedule, the worker availabilities, the worker geographic locations, and a project location; and/or (e) outputting, by the processor, the work schedule to a user interface, wherein the user interface is configured to receive at least one input relating to the work schedule from a user.

FIG. 1 is a schematic block diagram of a multi-task construction project platform, generally indicated at 100, for use with multi-task projects. The platform 100 includes systems and modules for use during various stages of construction projects. In addition, the platform 100 has a user interface for users to collaborate with each other, view project data, manage construction activities, and design and create documents for the multi-task project. The platform 100 utilizes application programming interfaces (API) 102 to interact with applications and operating systems. Preferably, the APIs 102 utilize a common structure that is compatible with a broad range of applications and operating systems to provide increased adaptability and utilization. For example, the API 102 may enable the platform 100 to interact with systems for building information modeling (BIM), computer aided drafting (CAD), enterprise resource planning (ERP), accounting, design functions, human resource management, and the internet of things (IOT).

The platform 100 includes one or more modules. For example, the platform 100 includes a develop module 104, a design module 106, a construct module 108, and an operate module 110. Each module 104, 106, 108, 110 provides tools, options, and reports that are tailored to phases of the multi-task project. However, the modules 104, 106, 108, 110 may be used during any phase of the multi-task project and are not used exclusively in chronological order. For example, a user may utilize the operate module 110 during a preconstruction or design phase of a multi-task project to assess expected performance of a proposed design based on a model of the completed project or historical data from a similar project. Moreover, the modules 104, 106, 108, 110 may utilize and share a common stream of data which increases the accuracy, reliability, and consistency of the reports and data generated by the platform 100. For example, the platform 100 may include one or more databases 112 including data relating to costs, schedules, materials, performance, location, labor, etc. Accordingly, the platform 100 may enable the use of real-time data and simplify the updates for the modules 104, 106, 108, 110 because the data is provided in a single location.

The develop module 104 is configured for use during initial stages of a multi-task project, for example, to generate or gather financial data, site data, feasibility studies, etc. In addition, the develop module 104 may be used for capital planning, viability assessment, and planning coordination. For example, a user may select a specific site or a list of site requirements using the develop module 104 and receive data regarding the site. In addition, the develop module 104 may generate a site assessment or other development report based on the user requirements and selections using the real-time data provided by the platform 100. In contrast, conventional development reports require data to be gathered from numerous sources. In contrast, the develop module 104 decreases the cost, labor, and time required to generate development reports in comparison to conventional systems. As a result, the develop module 104 may allow the user to evaluate a greater number of potential sites and select the site that best matches the requirements for the multi-task project.

The design module 106 is configured for use during the design phase of the multi-task project, for example, to generate project specifications, models, and drawings. In addition, the design module 106 may be used to provide design coordination and preconstruction planning. The design module 106 may interact with CAD software to allow uploading and/or editing of at least partially completed plans. In addition, the design module 106 may allow the user to prepare or compose new drawings. In addition, the design module 106 may enable two or more users to communicate and interact with each other to coordinate the multi-task project. In some embodiments, the design module 106 is used throughout the different phases of the multi-task project. For example, in a design-build construction process, the design module 106 may be used in conjunction with the construct module 108 to perform design functions while the construct module 108 is used to perform project management tasks during the multi-task project.

The construct module 108 is configured for use during a construction phase of the multi-task project to manage, for example, the project schedule, workforce, costs, materials, etc. The construct module 108 may include a construct system 114 which facilitates management of the project schedule, materials, and costs. In addition, the construct module 108 may include a workforce system 116 which facilitates management of the workforce for the multi-task project. For example, the workforce system 116 may be used to generate a worker assignment schedule for the multi-task project. In addition, the workforce system 116 may track performance data for the workers on the respective project and provide real-time updates regarding the project workforce. Moreover, the workforce system 116 may provide automated alerts when there are worker shortages, missed assignments, or other workforce issues.

The operate module 110 is configured for use during an operation phase of the multi-task project after construction is at least substantially completed. The operate module 110 provides operation data such as as-built information, settings for heating ventilation and air conditioning equipment, electrical controls, care and service information, warranty information, replacement information, and utility information. The operate module 110 may provide more accurate data for the user than conventional systems because the operate module 110 is able to access data that is used during the construction phases and receives data directly from the develop module 104, the design module 106, and the construct module 108. Moreover, the operate module 110 may allow the user to better control aspects of the operation to obtain increased efficiency in comparison to prior systems. For example, the operate module 110 may determine recommended settings for the HVAC in real-time based on current environmental conditions and the data from the construction, design, and develop phases such as building materials used for the building envelope, as-built drawings, conditions of the HVAC system, and desired performance criteria used during the develop phase. Moreover, the operate module may enable tracking of the performance data of the completed multi-task project for use in other multi-task projects. As a result, the operate module may provide increased operating efficiency such as by decreasing energy usage during the life of the structure.

The platform 100 may be accessible by users throughout the multi-task project for varying purposes using one or more user interfaces. The platform 100 may selectively allow authorized users to view, edit, manage, upload, and/or download data in the platform. For example, the platform may have a user interface for designers to add and edit drawings and a contractor interface that allows contractors to view drawings and submit questions regarding the drawings. In addition, the platform 100 may allow users to communicate with each other and the platform 100 may correlate the communication to specific documents or data stored or generated by the platform 100. Accordingly, the platform 100 provides a single platform for use through all phases of a multi-task project through conception, execution, and after construction is completed. As a result, the multi-task project is able to be completed in a shorter time frame and provide a higher quality product than multi-task projects that do not utilize the platform.

In addition, the platform 100 facilitates the management of two or more multi-task projects because the platform provides data that can be shared across the projects such as performance data and resource management. In addition, the platform 100 provides real-time updates on data that can affect the multi-task projects such as worker and/or material availability. In addition, the user may use the platform to manage multi-task projects from any location using a computing device.

Figure 2:
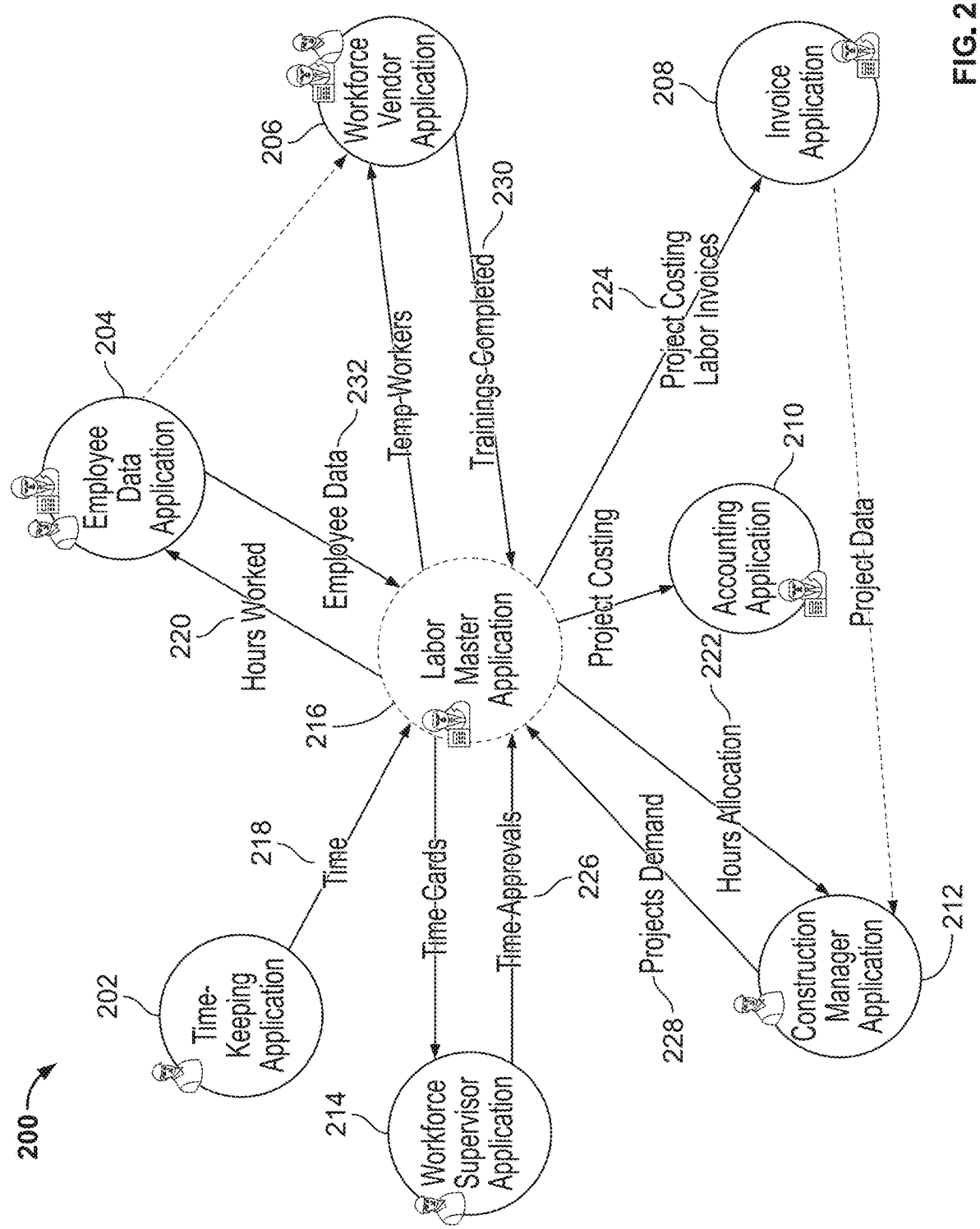
FIG. 2 is a schematic web diagram of a workforce system of the platform of FIG. 1, the workforce system configured to generate worker assignment schedules and manage workflow.

FIG. 2 is a schematic web diagram of an exemplary embodiment of a workforce system, generally indicated at 200, for use with the platform 100 (shown in FIG. 1). The workforce system 200 is configured to generate worker assignment schedules and manage workflow for the multi-task project. The workforce system 200 includes one or more applications that are used to process data related to the workforce. For example, the workforce system 200 includes a time-keeping application 202, an employee data application 204, a workforce vendor application 206, an invoice application 208, an accounting application 210, a construction manager application 212, and a workforce supervisor application 214. In other embodiments, one or more of the applications may be omitted.

Each application 202, 204, 206, 208, 210, 212, 214 may include an interface that enables a respective user to input and/or receive data from the workforce system 200. For example, a time keeper (e.g., a worker assigned to a multi-task project) may input and/or receive data using the time-keeping application 202. A human resources representative may input and/or receive data using the employee data application 204. A workforce vendor (e.g., a company providing temporary workers on a contract basis) may input and/or receive data using the workforce vendor application 206. Accounting representatives may input and/or receive data using the invoice application 208 and/or the accounting application 210. A project manager may input and/or receive data using the construction manager application 212. A worker supervisor (e.g., a site superintendent) may input and/or receive data using the workforce supervisor application 214. In some embodiments, the applications 202, 204, 206, 208, 210, 212, 214 are encrypted and only specified users may be authorized to use each application. However, users may have authorization to access more than one application and the authorized users for each application are not limited to the example users listed above.

Also, the workforce system 200 includes a labor master application 216 that receives data from and/or outputs data to any of the applications 202, 204, 206, 208, 210, 212, 214. For example, the labor master application 216 may receive time entry data 218 from the time keeping application 202. The labor master application 216 can then send the time entry data 218 to the workforce supervisor application 214 for approval. Also, the labor master application 216 determines workforce data such as hours worked 220 for each employee based on the time entry data. The labor master application 216 may send the hours worked 220 to the employee data application 204 for use for payroll or other employee management functions. In addition, the labor master application 216 can use the time entry data 218 to determine hours allocated 222 to a project, project costing data 224, or other data. The labor master application may send the determined data to other applications such as the construction manager application 212, the accounting application 210, and/or the invoice application 208. Moreover, the labor master application 216 may receive time approvals 226 from the workforce supervisor application 214, project demand data 228 from the construction manager application 212, training data 230 from the workforce vendor application 206, and employee data 232 from the employee data application 204. Also, the labor master application 216 may send requests for temporary worker assignments to the workforce vendor application 206. Accordingly, the labor master application 216 acts as a centralized hub for workforce data of the workforce system. In some embodiments, the data may be exchanged directly between two or more of the applications and may not necessarily pass through the labor master application 216. For example, the invoice application 208 may send project data directly to the construction manager application 212. The labor master application 216 may use the data to track performance data for workers on the multi-task project. For example, the workforce system 200 may provide more up-to-date and reliable worker assignment schedules and performance data because the labor master application 216 receives, collects, and exchanges data directly with the applications 202, 204, 206, 208, 210, 212, 214.

The employee data application 204 allows for tracking of employee data during the multi-task project because the employee data application 204 exchanges data with the labor master application 216 and the other applications. For example, the system 200 may track health and injury data for assigned workers and generate worker compensation claims when the worker is injured during a task. In addition, the system 200 may monitor and manage the worker compensation claim. The system 200 may also store data such as skills, competencies, licenses, certifications, training, job screenings for each worker, a communication log including communications to/from the worker, projects to which the worker has applied but not been assigned, projects to which the worker has applied and been assigned, projects to which the worker has been assigned without applying, projects for which the worker has applied and is a potential candidate, and projects for which the worker has not applied and is a potential candidate.

The workforce vendor application 206 provides vendors for contract workers direct access to data regarding their requisitions. In addition, the workforce vendor application 206 enables management of vendor purchase orders because the workforce vendor application 206 receives data on worker assignments, labor hours, invoices, etc. from the labor master application 216. In addition, the workforce vendor application 206 streamlines the process for invoice approval because the users can access the actual project data in real time and, in some embodiments, submit the invoices directly through the system 200. Moreover, the system 200 may generate invoice reports and payroll data for vendors based on the task and worker data in the system.

Figure 26:
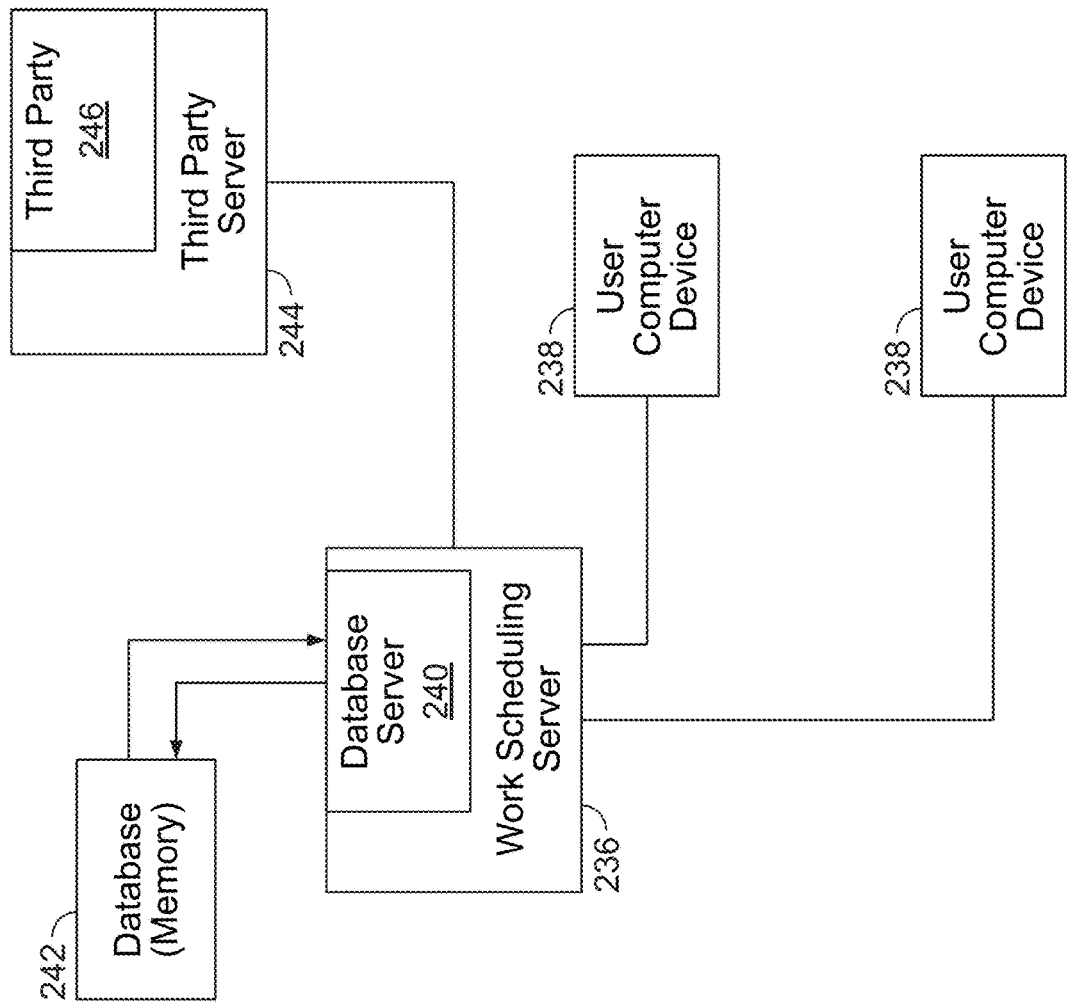
FIG. 26 is a simplified block diagram of a computing system of the system shown in FIG. 2.

FIG. 26 depicts a simplified block diagram of a computing system 234 of the system 200 shown in FIG. 2. The computing system 234 includes a work scheduling (WS) server 236 in communication with the user computer devices 238. In the exemplary embodiment, the user computer devices 238 are computers that include a web browser or a software application, which enables the user computer devices 238 to access the WS server 236 using the Internet. More specifically, the user computer devices 238 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The user computer devices 238 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 240 may be communicatively coupled to a database 242 that stores data. In one embodiment, the database 242 may include a project location, worker availability data, worker location data, performance data, schedule data, project data, employee data, task data, and/or any other suitable data. In the exemplary embodiment, the database 242 may be stored remotely from the WS server 236. In some embodiments, the database 242 may be decentralized. In the exemplary embodiment, a person may access the database 242 via the user computer devices 238 by logging onto the WS server 236.

The WS server 236 may be communicatively coupled with the user computer devices 238. In some embodiments, the WS server 236 may be associated with, or is part of a computer network associated with a company that generates construction work schedules, or in communication with the company's computer network (not shown). In other embodiments, the WS server 236 may be associated with a third party and is merely in communication with the company's computer network.

One or more third party servers 244 may be communicatively coupled with the WS server 236. The one or more servers 244 each may be associated with a third party (e.g., a vendor or supplier) 246. The third party 246 may sell products and/or services required for the project. For example, the third party 246 may provide labor for performing tasks of the multi-task project and/or supply products or materials for use for the multi-task project.

Figure 27:
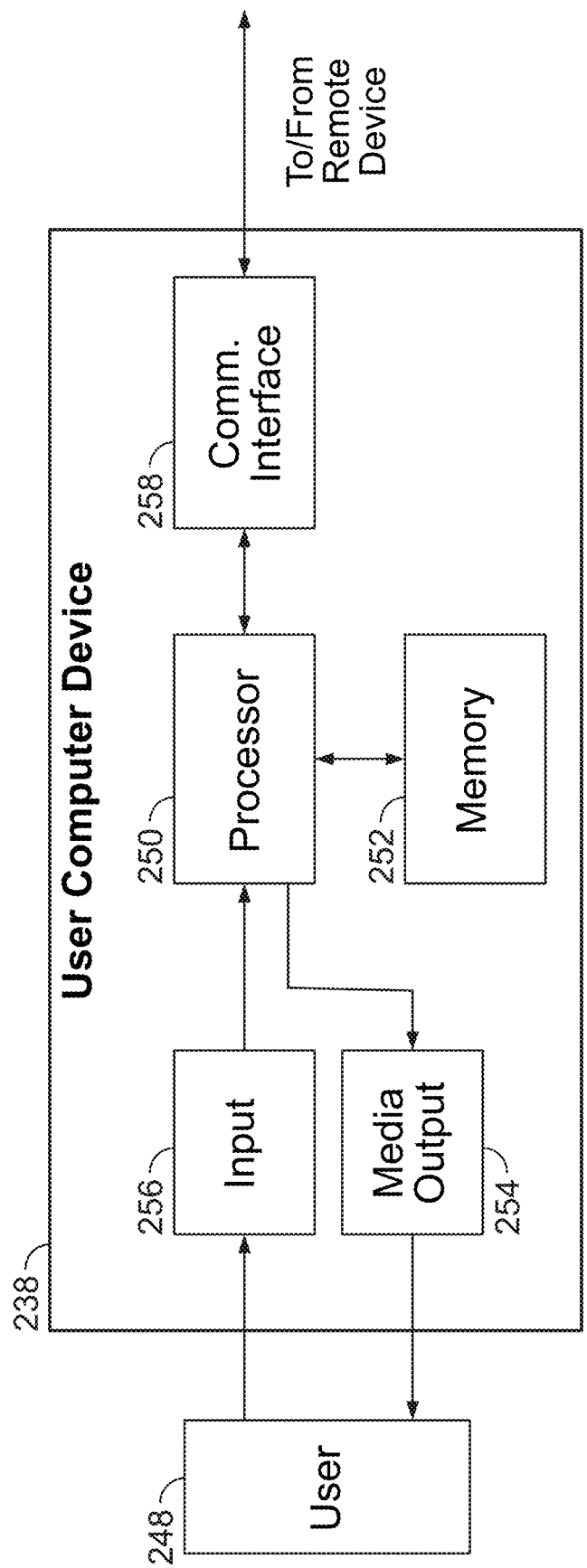
FIG. 27 is a simplified block diagram of an exemplary configuration of a user computer device shown in FIG. 26.

FIG. 27 depicts an exemplary configuration of a user computer device 238 shown in FIG. 26, in accordance with one embodiment of the present disclosure. The user computer device 238 may be operated by a user 248. The user computer device 238 may include a processor 250 for executing instructions. In some embodiments, executable instructions are stored in a memory area 252. The processor 250 may include one or more processing units (e.g., in a multi-core configuration). The memory area 252 may be any device allowing data such as executable instructions and/or transaction data to be stored and retrieved. The memory area 252 may include one or more computer readable media.

The user computer device 238 may also include at least one media output component 254 for presenting data to the user 248. The media output component 254 may be any component capable of conveying data to the user 248. In some embodiments, the media output component 254 may include an output adapter (not shown) such as a video adapter and/or an audio adapter. An output adapter may be operatively coupled to the processor 250 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, the media output component 254 may be configured to present a graphical user interface (e.g., a web browser and/or a client application) to the user 248. A graphical user interface may include, for example, an online store interface for viewing and/or purchasing items, and/or a wallet application for managing payment data. In some embodiments, the user computer device 238 may include an input device 256 for receiving input from the user 248. The user 248 may use the input device 256 to, without limitation, select and/or enter one or more work orders and/or a placement request, or to access credential data, and/or payment data.

The input device 256 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of the media output component 254 and the input device 256.

The user computer device 238 may also include a communication interface 258, communicatively coupled to a remote device such as the WS server 236 (shown in FIG. 26). The communication interface 258 may include, for example, a wired or wireless network adapter and/or a wireless data transceiver for use with a mobile telecommunications network.

Stored in the memory area 252 are, for example, computer readable instructions for providing a user interface to user 248 via media output component 254 and, optionally, receiving and processing input from input device 256. A user interface may include, among other possibilities, a web browser and/or a client application. Web browsers enable users, such as the user 248, to display and interact with media and other data typically embedded on a web page or a website from the WS server 236. A client application allows the user 248 to interact with, for example, the WS server 236. For example, instructions may be stored by a cloud service, and the output of the execution of the instructions sent to the media output component 254.

The processor 250 executes computer-executable instructions for implementing aspects of the disclosure. In some embodiments, the processor 250 is transformed into a special purpose microprocessor by executing computer-executable instructions or by otherwise being programmed.

FIG. 28 depicts an exemplary configuration of a server computer device 260, in accordance with one embodiment of the present disclosure. The server computer device 260 may include, but is not limited to, the database server 240, the WS server 236, and the third party server 244 (all shown in FIG. 26). The server computer device 260 may also include a processor 262 for executing instructions. Instructions may be stored in a memory area 264. The processor 262 may include one or more processing units (e.g., in a multi-core configuration).

The processor 262 may be operatively coupled to a communication interface 266 such that server computer device 260 is capable of communicating with a remote device such as another server computer device 260, third party server 244, or the user computer devices 238 (shown in FIG. 26). For example, the communication interface 266 may receive requests from user computer devices 238 via the Internet, as illustrated in FIG. 26.

The processor 262 may also be operatively coupled to a storage device 268. The storage device 268 may be any computer-operated hardware suitable for storing and/or retrieving data, such as, but not limited to, data associated with the database 242 (shown in FIG. 26). In some embodiments, the storage device 268 may be integrated in the server computer device 260. For example, the server computer device 260 may include one or more hard disk drives as the storage device 268.

In other embodiments, the storage device 268 may be external to the server computer device 260 and may be accessed by a plurality of server computer devices 260. For example, the storage device 268 may include a storage area network (SAN), a network attached storage (NAS) system, and/or multiple storage units such as hard disks and/or solid state disks in a redundant array of inexpensive disks (RAID) configuration.

In some embodiments, the processor 262 may be operatively coupled to the storage device 268 via a storage interface 270. The storage interface 270 may be any component capable of providing the processor 262 with access to the storage device 268. The storage interface 270 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 262 with access to the storage device 268.

Figure 4:
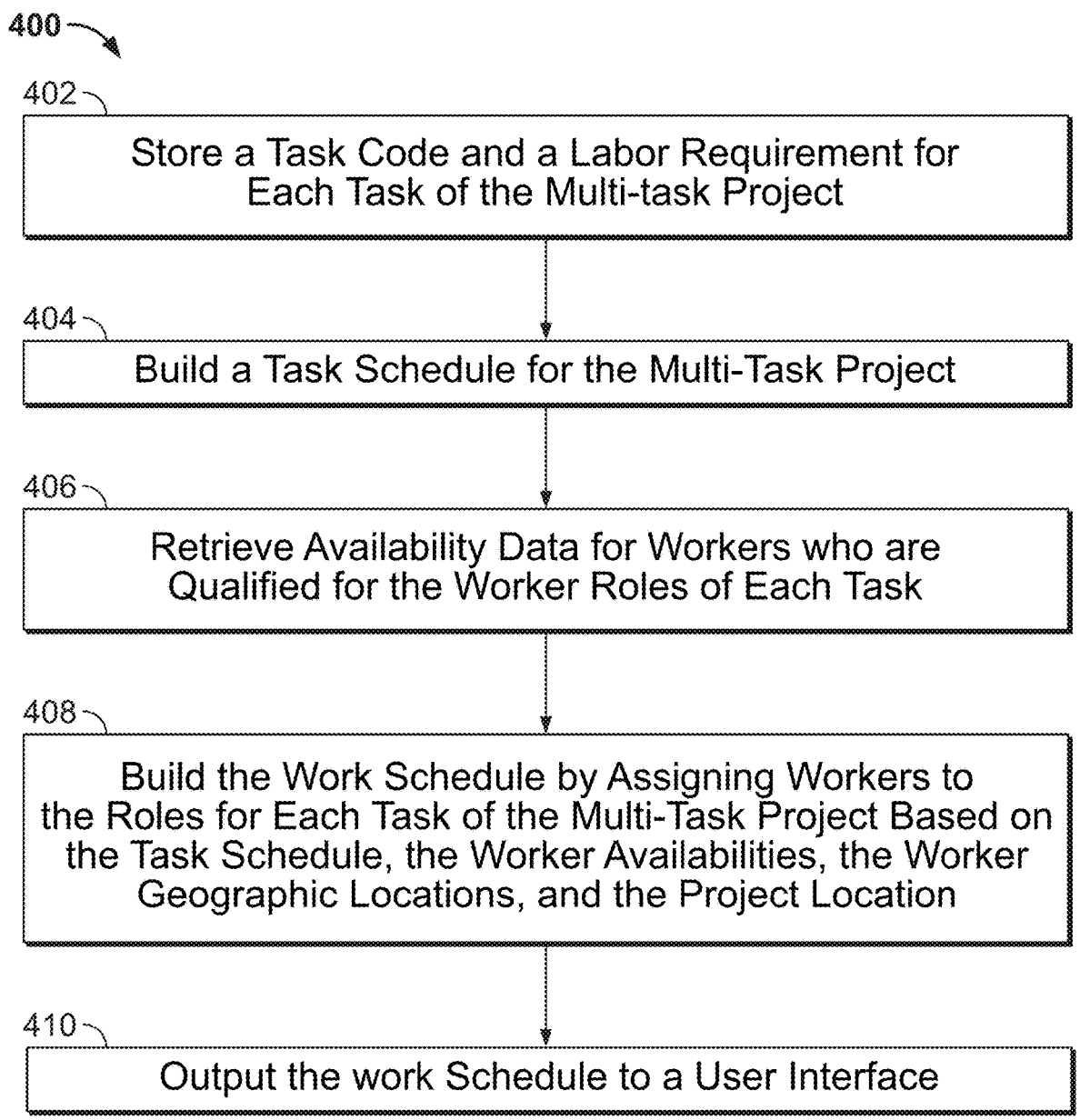
FIG. 4 is a flowchart of a computer-implemented process of generating worker assignment schedules and managing workforces for a multi-task project.

The processor 262 may execute computer-executable instructions for implementing aspects of the disclosure. In some embodiments, the processor 262 may be transformed into a special purpose microprocessor by executing computer-executable instructions or by otherwise being programmed. For example, the processor 262 may be programmed with the instruction such as illustrated in FIG. 4.

Figure 3A:
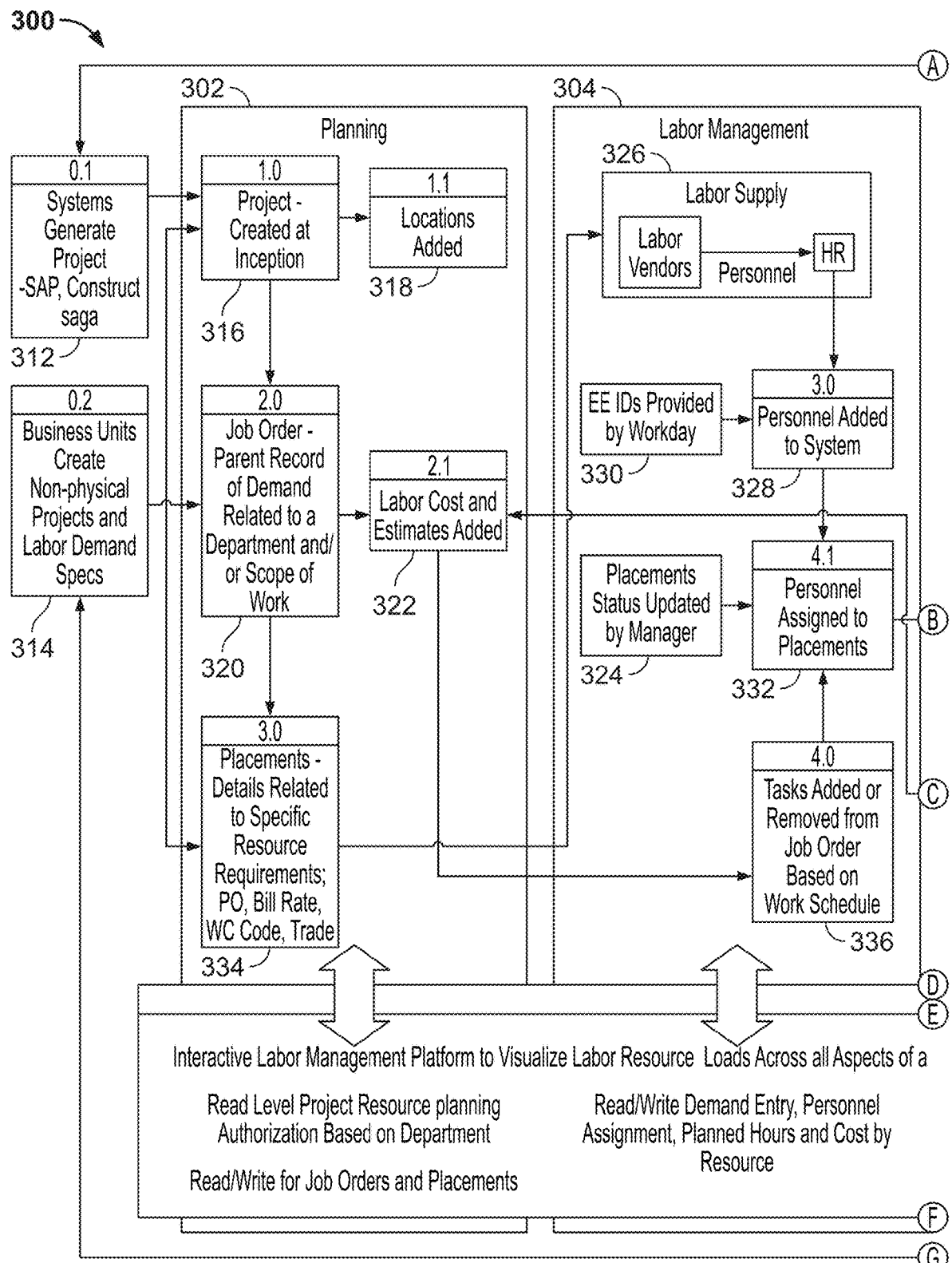
FIGS. 3A and 3B are a flowchart of data flow through the workforce system shown in FIG. 2.
Figure 3B:
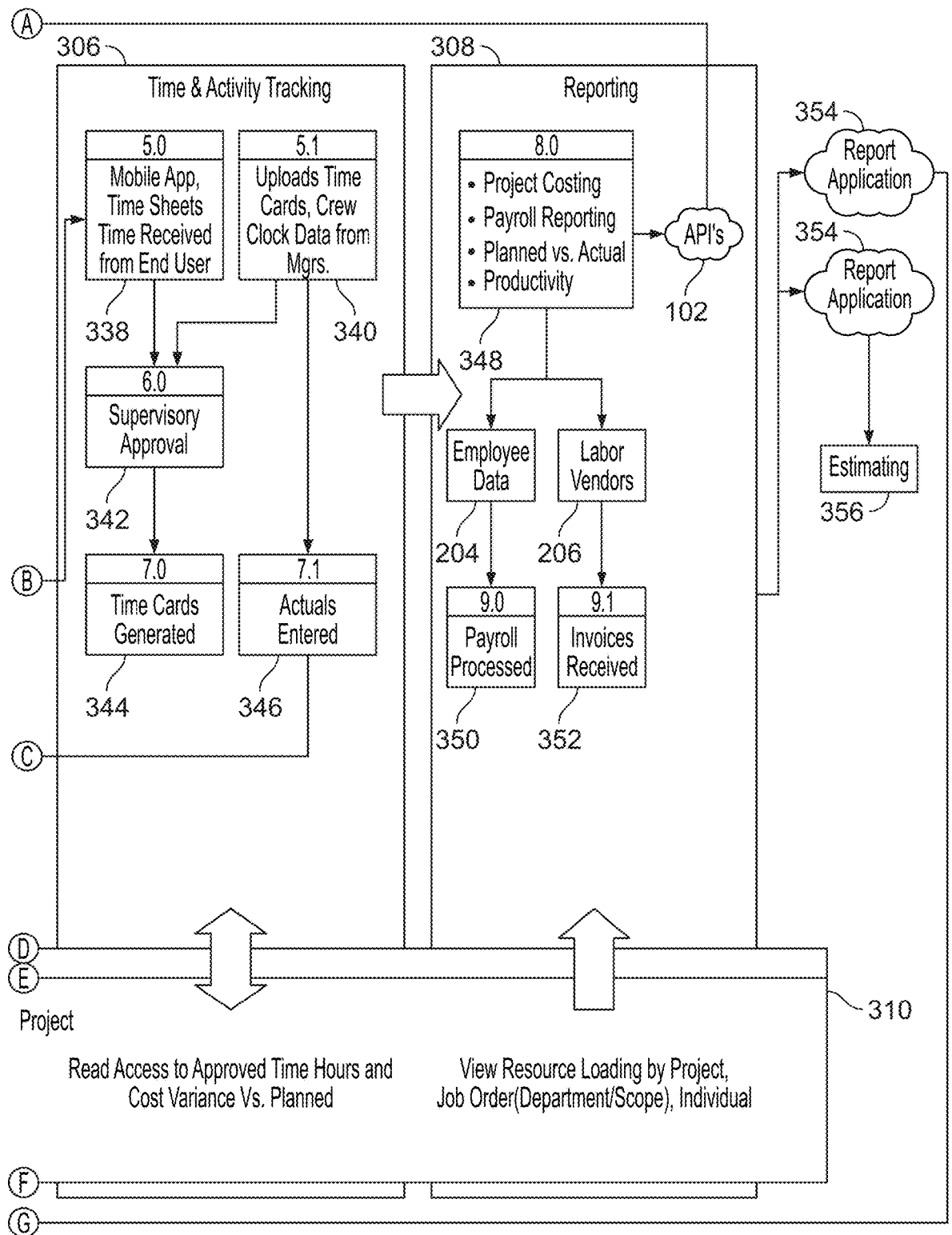

FIGS. 3A and 3B are a flowchart of data flow, generally indicated at 300, through the system 200 (shown in FIG. 2). The data flow 300 is divided into a planning phase 302, a labor management phase 304, a time and activity tracking phase 306, and a reporting phase 308. In reference to FIGS. 2 and 3, the workforce system 200 facilitates data exchange for resource planner 310 and all phases 304, 306, 308 of the data flow 300. For example, in some embodiments, the workforce system 200 includes a user interface which facilitates visual representations for resource planner 310. In addition, the resource planner 310 of the workforce system 200 provides access and/or editing for level project resource planning, job orders and placements, demand entry, worker assignment, planned hours and cost by resource, approved time hours and costs, comparison of task variance versus planned metrics, and resource loading by project, job order, or individual.

In some embodiment, the resource planner 310 is provided on a user interface including one or more user input and/or output devices. The resource planner 310 provides direct interaction of the user to the data in a database during each phase 304, 306, 308 of the data flow 300. For example, the resource planner 310 provides job order placement records over time period. The resource planner 310 provides total department visibility because the data regarding resources is available in a single location for users. The resource planner 310 may compare planned resource utilization to actual resource utilization for both hours and cost for each multi-task project. Also, the resource planner 310 may identify where resources are being over or under utilized by comparing the actual usage to expected usage for the resource. In addition, the resource planner 310 may build cost and resource models based on customized load curves, local wages, and required trade ratios.

The workforce system 200 generates project requirements 312 which may be output for determination of project and labor demand specifications 314. In some embodiments, workforce system 200 outputs project requirements 312 for interpretation by a user and the user determines the project and labor demand specifications 314. For example, the workforce system 200 may generate a report including the project requirements 312 and/or send the project requirements 312 to users. In some embodiments, the users are classified in business units and workforce system 200 sends the project requirements 312 to each individual user in the business unit and/or to a user related to the business unit such that the business unit can determine project and labor demand specifications 314. The business units may include users from any of construction groups, design groups, research and development departments, human resources departments, and/or any group that has variability in demand or plans resources. The business units may also determine project and labor demand specifications 314 at least partly based on internal group information such as a group backlog. Accordingly, the user may input information relating to the project and labor demand specifications 314 into the workforce system 200. In further embodiments, the workforce system 200 at least partly determines the project and labor demand specifications 314.

The project requirements 312 and the project and labor demand specifications 314 are used to create a project file 316. A project location 318 is selected and added to the project file. A job order 320 is determined based on the project and labor demand specifications 314 and the project file 316. The job order 320 includes a record of demand related to a labor department and/or scope of work. Also, labor and cost estimates 322 are added to the job order 320. Placements 324 are determined based on the job order 320 and the project file 316. The workforce system 200 may receive data relevant to the placements 324 using the platform 100 (shown in FIG. 1) and update the placement data in real-time. For example, the workforce system 200 may add or remove tasks from the job order based on project schedule data in the construction module 108 (shown in FIG. 1). Estimated tasks 336 may be available to assign to job orders 320 based on the labor and costs estimates 322. The placements 324 are used to generate a labor supply 326 including labor provided by workforce vendors. The labor supply 326 may be determined at least partially upon data form the workforce vendor application 206.

The employee data application 204 or another application receives employee data 328 such as employee identification codes 330 and the workforce system 200 adds the data to the placements. Then the workforce system 200 assigns 332 individual workers to the placements 324. For example, the workforce system 200 assigns the workers to the placement 324 by correlating the employee identification code and the task code related to the placement 324. The placement status 334, e.g., filled or unfilled, may be updated by a manager using the workforce system 200 and/or automatically by the system.

Also, the resource planner 310 may be used to facilitate the worker assignments. For example, the resource planner 310 can facilitate locating candidates for worker assignment based on criteria set for availability, skill, and project location based on project requirements. The resource planner 310 compares the criteria to the data associated with each worker in the database. Specifically, the resource planner 310 compares the availability criteria of the job order to the availability status for each worker, compares the skill criteria to the skill data for each worker, and compares the project location to each worker's location. The resource planner 310 determines that the worker is a potential candidate if there is a match between each job order criteria and the worker data regardless of if the candidate has applied for the job order. In some embodiments, the resource planner 310 accounts for the end date of a worker according to the resource plan when comparing the availability data. Moreover, the resource planner 310 may access and account for recruiter ratings and referrals to streamline the worker assignment process and provide an increased chance of a positive outcome for the worker assignment.

In the time and activity tracking phase 306, the workforce system 200 uses the assigned placements 324 to record time entries 338 received from assigned workers. The time entries 338 may be input using a mobile computing device such as a smart phone. In addition, time cards 340 including crew clock data are received from managers and can be compared to the time entries 338 to verify the accuracy of the time entries. The time entries 338 and the time cards 340 may be approved 342 by a supervisor. After approval, work time cards 344 are sent to accounting for payroll processing. In addition, the workforce system 200 may determine actual hours worked 346 based on the time cards 340. The actual hours worked 346 may be input back into the labor and cost estimates 322 to increase the accuracy of the estimates.

In the reporting phase 308, the workforce system 200 generates reports 348 based on the worker assignment and performance data provided during the time and activity tracking phase 306. The reports 348 may include project costing reports, payroll reports, planned vs. actual performance comparisons, productivity reports, lost time reports, staffing performance reports, worker turnover reports, safety reports, etc. The reports may include charts, graphs, images, text, hyperlinks, and any other suitable data. The reports are sent to the APIs 102 (shown in FIG. 1) and may be used in any of the modules of the platform 100 (shown in FIG. 1). For example, the platform 100 may generate project requirements 312 using the reports provided via the APIs 102. In addition, the reports are sent to the employee data application 204 and the workforce vendor application 206. The employee data application 204 may use the reports to process payroll 350 for the multi-task project. Also, the workforce vendor application 206 can use the reports to prepare invoices 352 for payment.

In addition, the workforce system 200 may send data from the reporting phase 308 to reporting applications 354 that generate further reports. The specialized reports may be used for estimating 356 or other functions. In addition, the reports may be used to generate project and labor demand specifications 314 for the current or other multi-task projects. The reporting applications 354 may provide the reports in a format that is compatible with different computing devices such as mobile computing devices and is familiar to users. As a result, the reports may be simpler to distribute to different users and easier for the users to understand.

The system 200 and the data flow 300 enable labor supply and demand to be coordinated across all projects because the data for each project is updated in real-time and is able to be related to other projects. In addition, the placements 324 are able to be filled with existing employees, external sources, and new hires because the system 200 analyzes all available and possible worker options for assignment or recruitment.

FIG. 4 is a flow chart of a method 400 of generating a work schedule for a multi-task project. The method 400 may be implemented using the workforce system 200. The workforce system 200 includes at least one computing device (e.g., the server computer device 260, shown in FIG. 28) including a processor in communication with a memory. The processor may be programmed to operate in accordance with instructions stored in the memory that cause the computing device to perform the steps of the method 400.

The server computer device stores 402 a task code and a labor requirement for each task of the multi-task project. The task codes relate each task to at least one construction activity. For example, in some embodiments, the task codes are based on a standardized construction phase code system. Accordingly, the task codes allow identification of the construction activities related to each task and enable tracking of the tasks for the multi-task project.

In addition, the server computer device builds 404 a task schedule for the multi-task project. The task schedule includes labor hours, a projected time frame, and worker roles for each task. The labor hours may be used to determine the number of workers that need to be assigned to the task to meet the projected time frame. The projected time frame may include a projected start date, an estimated task duration, and/or a projected task completion date. In embodiments in which the task code is correlated to specific construction activities, the worker roles may be generated based at least in part on the task code for the respective task. The worker roles may include the number of workers required and worker qualifications for the construction activities of the task. For example, in some embodiments, building 404 a task schedule includes determining qualification criteria for each task of the multi-task project.

Also, in some embodiments, the workforce system may generate placement requests based on the task schedule. For example, the workforce system may generate a placement request for each role of the tasks based on the project location and the qualification criteria associated with each task.

The server computer device retrieves 406 availability data for workers who are qualified for the worker roles of each task. The availability data for each worker includes an availability status and a worker location. The availability data is retrieved from a database such as the database 112 of the platform 100. Each worker in the database may be associated with a worker identification code, a worker location, a trade skill, and an availability status. The worker data may be provided by the workers, employers, vendors, publically available data sources such as information available on the internet, and/or other sources. For example, the availability status may be provided by the workers, provided by employers or vendors, and/or determined based on data in the system such as previous assignments to projects. In some embodiments, the worker location is received based on data correlated with the worker such as a home residence. In further embodiments, real-time location data is received from mobile devices correlated with the workers. For example, the mobile devices may send the geographic location of the workers when time entry or other data is sent by the worker to the employer using an application on a mobile device correlated with the worker.

The server computer device builds 408 the work schedule by assigning workers to the roles for each task of the multi-task project based on the task schedule, the worker availabilities, the worker geographic locations, and the project location. For example, before assigning a worker to a task, data for the worker is compared to the qualifications of the worker role of the task to ensure that the worker is qualified to perform the construction activities required for the task. Specifically, the trade skill and any certifications of each worker may be compared to the qualification criteria of the task. Also, the availability of the workers for the task may be determined based on the projected time frame of the task and the worker availability status. Each worker location may be compared to the project location prior to assigning the respective worker to a role for the project to ensure that the assigned workers are located within a designated vicinity of the project. If there are not enough qualified workers within the area of the project location, the search radius may be increased to locate additional workers. In some embodiments, the worker locations and the project location are compared by generating a geographical map including the project location and worker locations.

The work schedule includes the assigned workers and tasks. A worker is assigned to a task by associating the worker identification code of the worker and the task code of the task with a job order. The job order may also include a headcount of the workers. Each job order may include one or more tasks and the workers assigned to the job order. For example, the processor stores in the memory a list of worker identification codes of the assigned workers and the associated tasks for each job order. The task code is a unique identifier for each task of the multi-task project and allows data tracking for the task. For example, when the assigned workers perform a construction activity for each task, performance data for the construction activities of each assigned worker is collected and stored in the memory. The collected performance data is associated with the worker identification code and the task code. In some embodiments, the performance data includes a completion time frame for at least one construction activity from the task schedule. The method may include comparing the completion time frame to the projected time frame in the task schedule and providing an alert if a difference between the completion time frame and the projected time frame is greater than a threshold value. The performance data for workers on each multi-task project may be stored in the database as historical performance data and the historical performance data may be used to assign workers to tasks. For example, the performance data may indicate that a specific worker had a greater efficiency performing a task than other workers. Accordingly, the worker with the greater efficiency may be assigned to the same task for other multi-task projects. In addition, the performance data may include completed labor hours for the task and the completed labor hours may be compared to estimated labor hours for the task.

The server computer device outputs 410 the work schedule to a user interface. The user interface may be configured to display the work schedule for interpretation by the user. For example, the user interface may display the work schedule as a list or a flowchart that fits on a screen of the computing device of the user and allows the user to view the relevant data from the work schedule. The user interface may allow the user to input data related to the work schedule. For example, the user may change or update worker assignments. In addition, the user may retrieve data regarding one or more of the assigned workers and/or the tasks using the worker identification codes and/or the task codes.

In addition, the workforce system may generate reports and/or alerts based upon the work schedule. For example, an alert may be sent to the user interface if at least one role in the work schedule is not filled by an assigned worker and/or if the estimated labor hours for workers assigned to a task is less than the labor hours required to complete the task. Moreover, the system may identify potential workers in the database that have not applied for assignment and send recruitment requests to the potential workers in the database that match at least one of the project location, the qualification criteria, and the availability status associated with the placement request. In some embodiments, a subsequent placement request may automatically be generated if the estimated labor hours are less than the labor hours included in the schedule data and/or an alert may be provided to the user.

FIGS. 5-24 are illustrations of an exemplary embodiment of a user interface 500 for the system shown in FIG. 2. The user interface 500 allows a user to operate the system 200, access data, and generate worker assignment schedules. The user interface 500 may be accessed on a computing device including a processor in communication with a memory. A user may input data and/or interact with the user interface using any suitable input device. For example, the computing device may include a computer mouse, a keyboard, and/or a touch screen which allows the user to select the icons and buttons.

Figure 5:
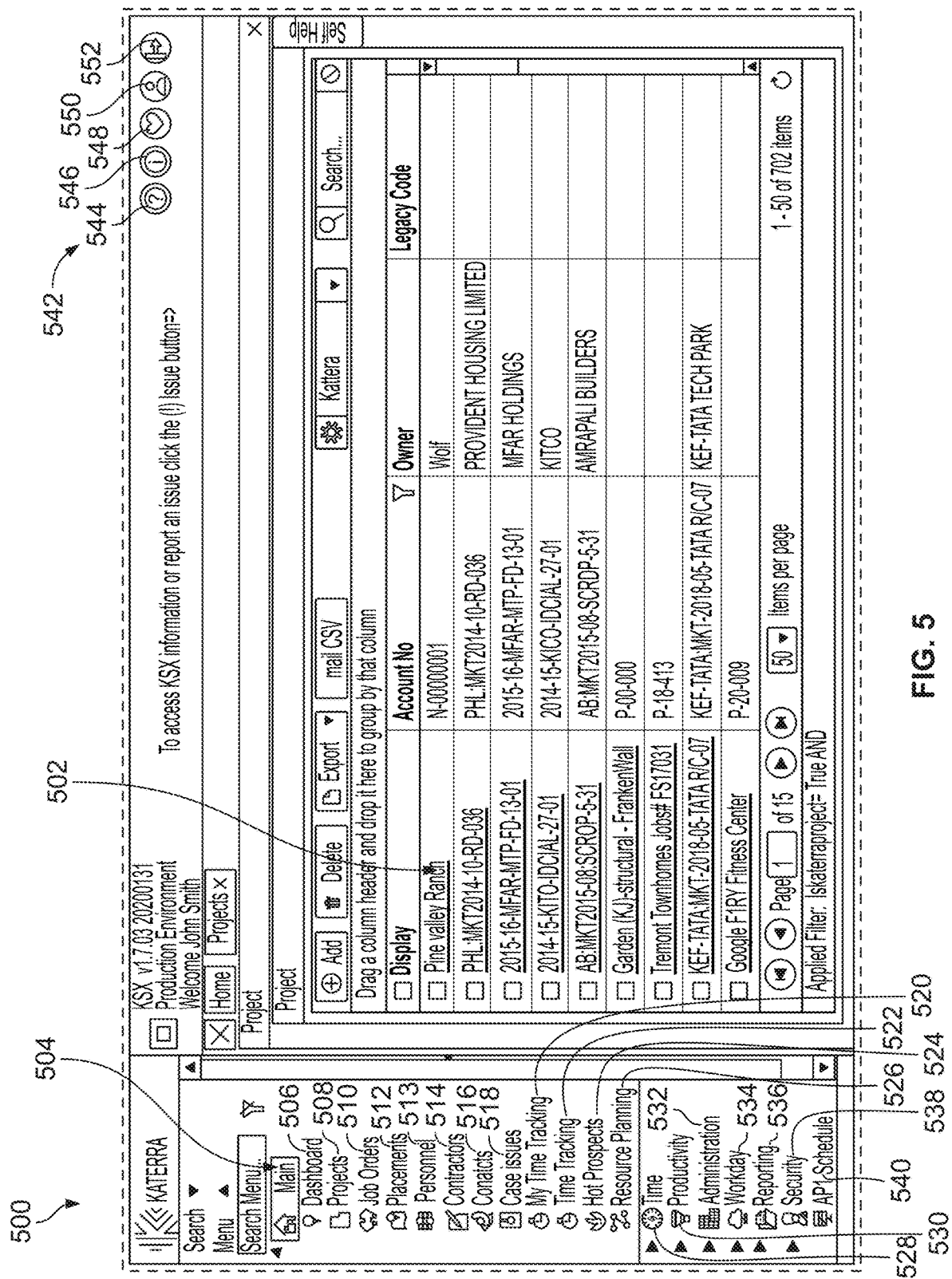
FIG. 5 is an illustration of an exemplary embodiment of a user interface for the workforce system shown in FIG. 2.

The landing page of the user interface 500 shown in FIG. 5 includes a project list 502 with selectable projects. The user can select one of the listed projects to navigate through data regarding the project. The user interface 500 also includes menus, toolbars, windows, buttons, and other features that enable a user to interact with the system. For example, the user interface 500 includes a menu 504 that allows a user to navigate through different windows of the user interface 500. The menu 504 includes selectable icons for "Dashboard" 506, "Project Window" 508, "Job Orders" 510, "Placements" 512, "Personnel" 513, "Contractors" 514, "Contacts" 516, "Case Issues" 518, "My Time Tracking" 520, "Time Tracking" 522, "Hot Prospects" 524, "Resource Planning" 526, "Time" 528, "Productivity" 530, "Administration" 532, "Workday" 534, "Reporting" 536, "Security" 538, and "API Schedule" 540. In addition, the user interface 500 includes a toolbar 542 including buttons for "Help" 544, "Report Issue" 546, "Favorite" 548, "Profile" 550, and "Return" 552.

Figure 6:
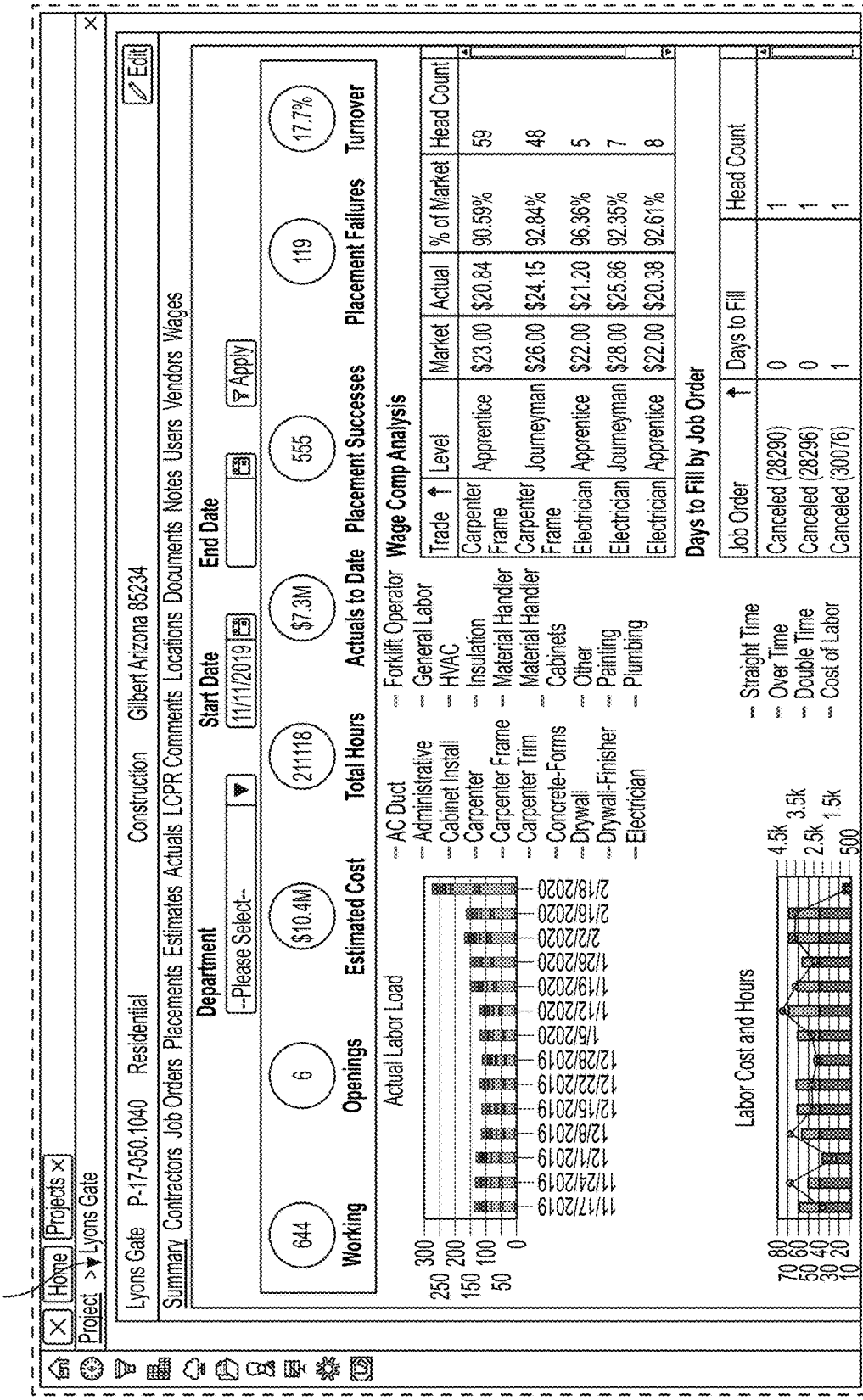
FIG. 6 is an illustration of a "Project Summary" window of the user interface shown in FIG. 5.

FIG. 6 is an illustration of a "Project Summary" window 554 of the user interface 500. The user may navigate to the "Project Summary" window by selecting a project from the project list 502 under the "Project Window" 508 option of the user interface 500. The "Project Summary" window 554 includes a summary page with calculated totals, icons, and charts which summarize project financial, workforce, and schedule data.

Figure 7:
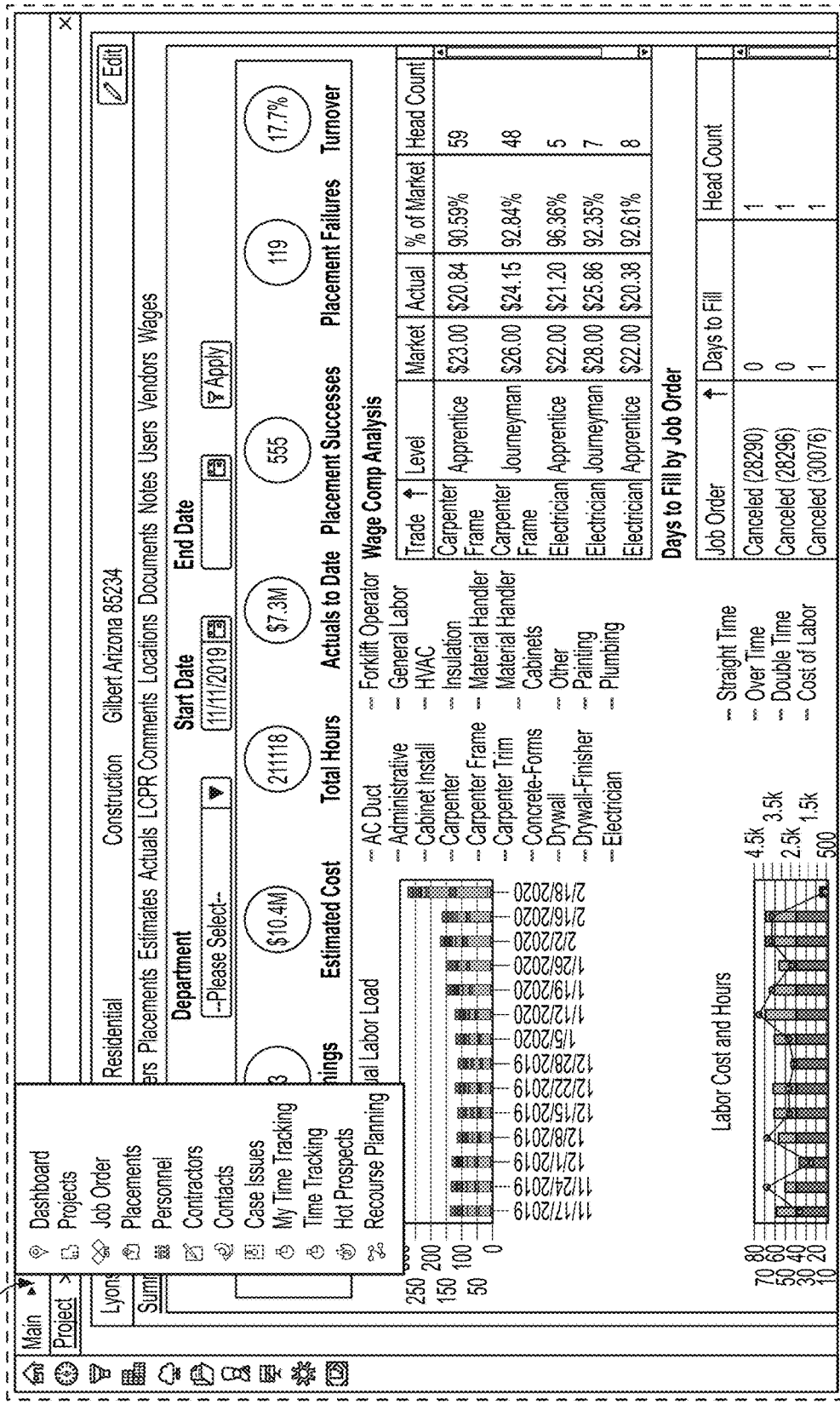
FIG. 7 is an illustration of the "Project Summary" window shown in FIG. 6 with a drop down menu.

FIG. 7 is an illustration of the "Project Summary" window 554 with a drop down menu selected. Using the user interface 500, the user may access data and options that are related to detailed financial, workforce, and schedule data for each project using the drop down menu or by selecting interactive icons in the windows. For example, in addition to the "Project Summary" window 554, the user interface 500 includes a "Job Order" window 556 (FIG. 8), a "Placements" window 558 (FIG. 9), a "Job Order Placement" window 560 (FIG. 10), a "Task" window 562 (FIG. 11), a "Geographical Placements" window 564 (FIG. 12), an "Estimates" window 566 (FIG. 13), a "Project Productivity Estimate" window 568 (FIG. 14), an "Actual Data" window 570 (FIG. 15), a "Project Productivity Actual" window 572 (FIG. 16), and a "Staff Project Hours" window 574 (FIG. 17).

Figure 12:
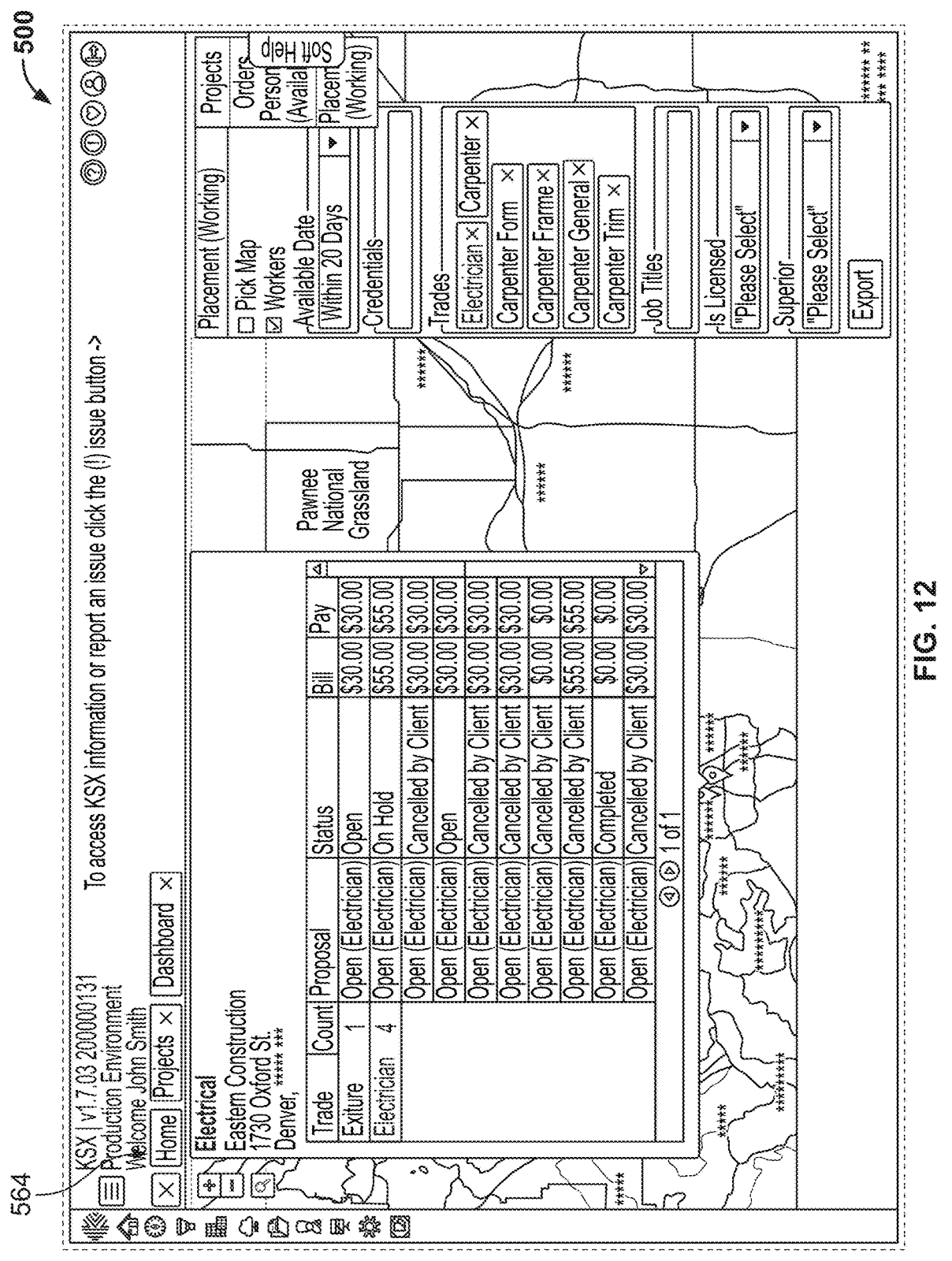

Referring to FIGS. 8-12, a user may use the user interface 500 to assign workers to tasks for a multi-task project and build a work schedule for the multi-task project. For example, the user can locate job orders on the "Job Order" window. The job orders include roles for tasks in the project. The job orders may be generated automatically from the task schedule and tasks codes provided for the project as shown in the "Task" window. The job orders can be used to generate to generate one or more placement requests as shown in FIGS. 9 and 10. The user may search for workers in a database that can be assigned to the placement requests using the user interface 500. For example, FIG. 12 shows a geographical search for workers in a specified region on a geographical map. The workers can be filtered by qualifications (e.g., trade or skill level), location, and availability.

Figure 18:
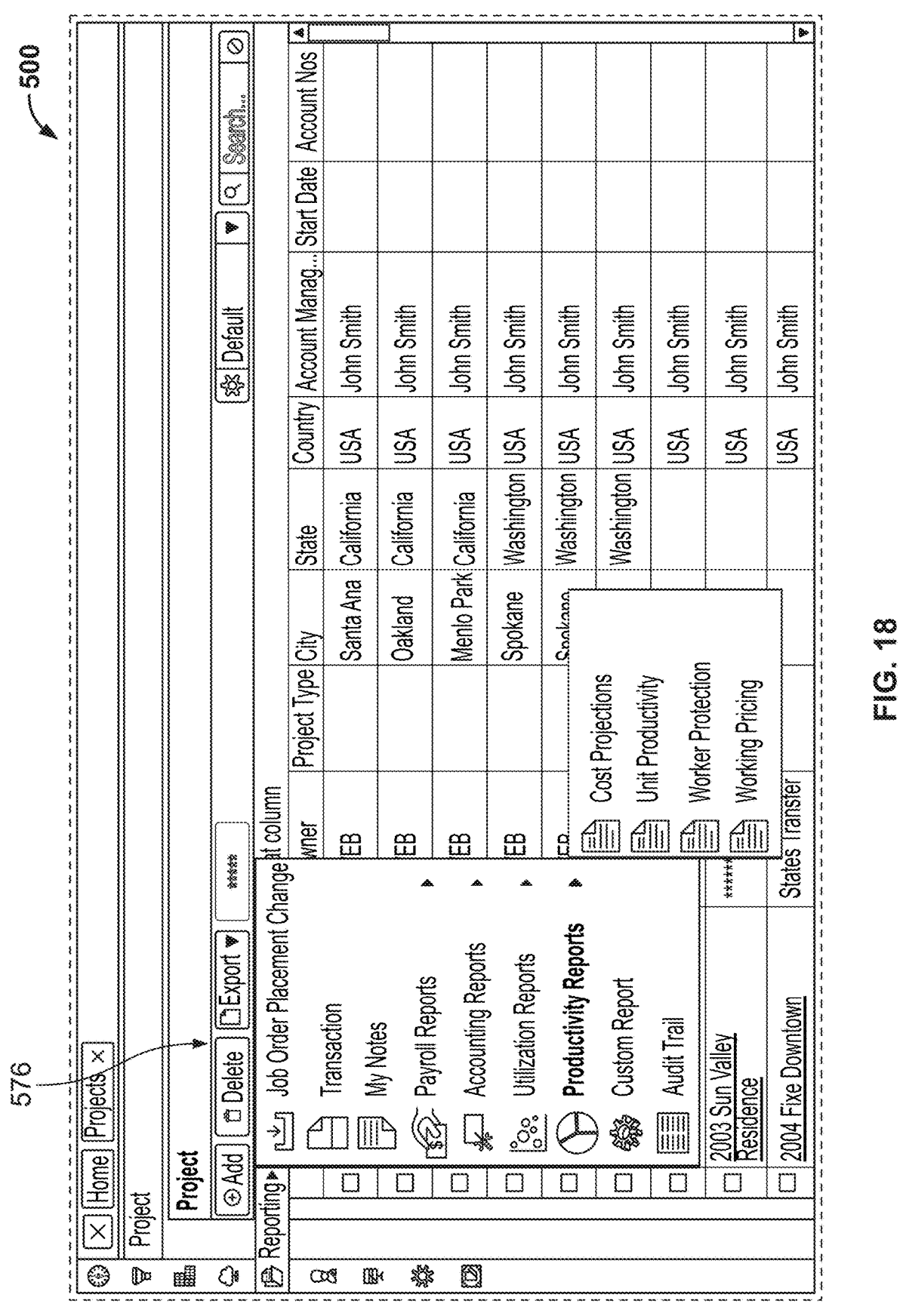

FIG. 18 is an illustration of the user interface 500 with a "Reporting" drop down menu 576. The "Reporting" drop down menu 576 allows the user to select reports that may be generated based on the project data. For example, the menu 576 includes options to generate reports for "Job Order Placement Changes", "Invoices", "My Notes", "Payroll", "Accounting", "Utilization", "Productivity", "Custom Reports", and "Audit Trails".

FIG. 19 is an illustration of a "My Time Sheet" window 578 of the user interface 500. FIG. 20 is an illustration of a "Time Entry" window 580 of the user interface 500. The "My Time Sheet" window 578 and the "Time Entry" window 580 enable a user to add, view, and edit time sheets and time entries and to submit the time entries for approval.

Figure 21:
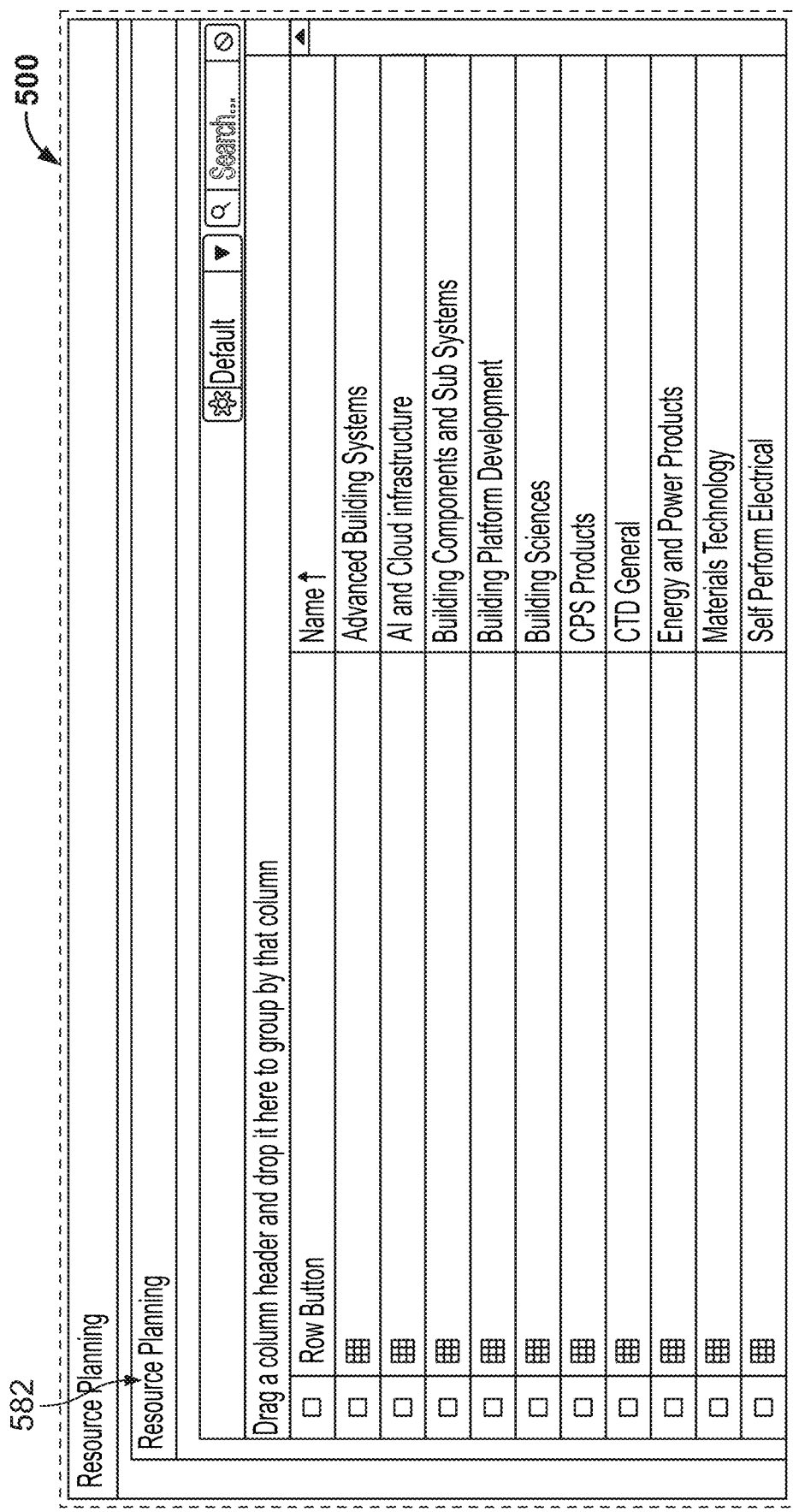
FIG. 21 is an illustration of a "Resource Planning" window of the user interface shown in FIG. 5.

FIG. 21 is an illustration of a "Resource Planning" window 582 of the user interface 500. The "Resource Planning" window 582 enables a user to view data regarding materials and resources that are available or being used by multi-task projects and determine allocation of the resources.

Figure 22:
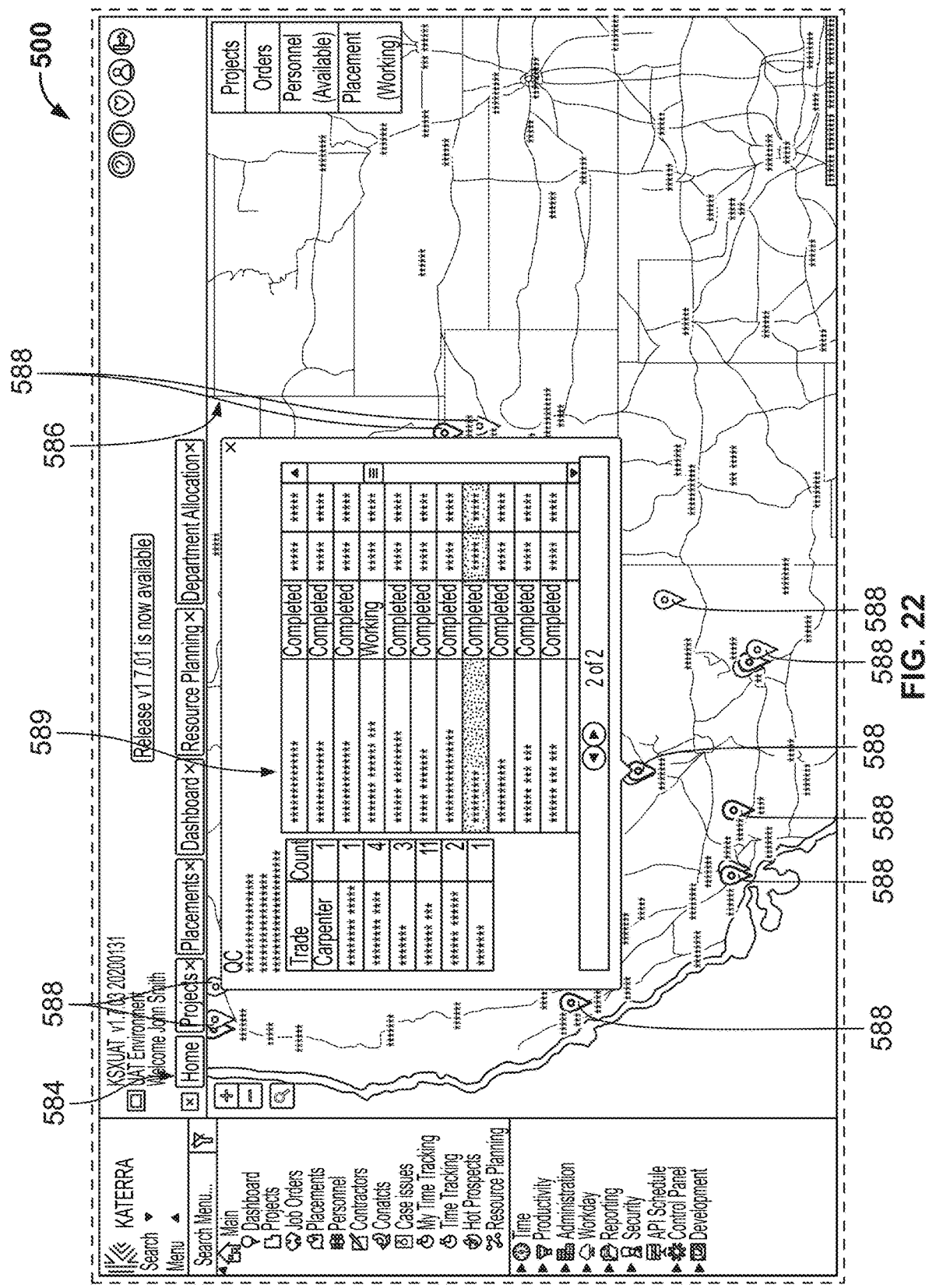
FIG. 22 is an illustration of a "Project" window of the user interface shown in FIG. 5, including a geographical map.
Figure 23:
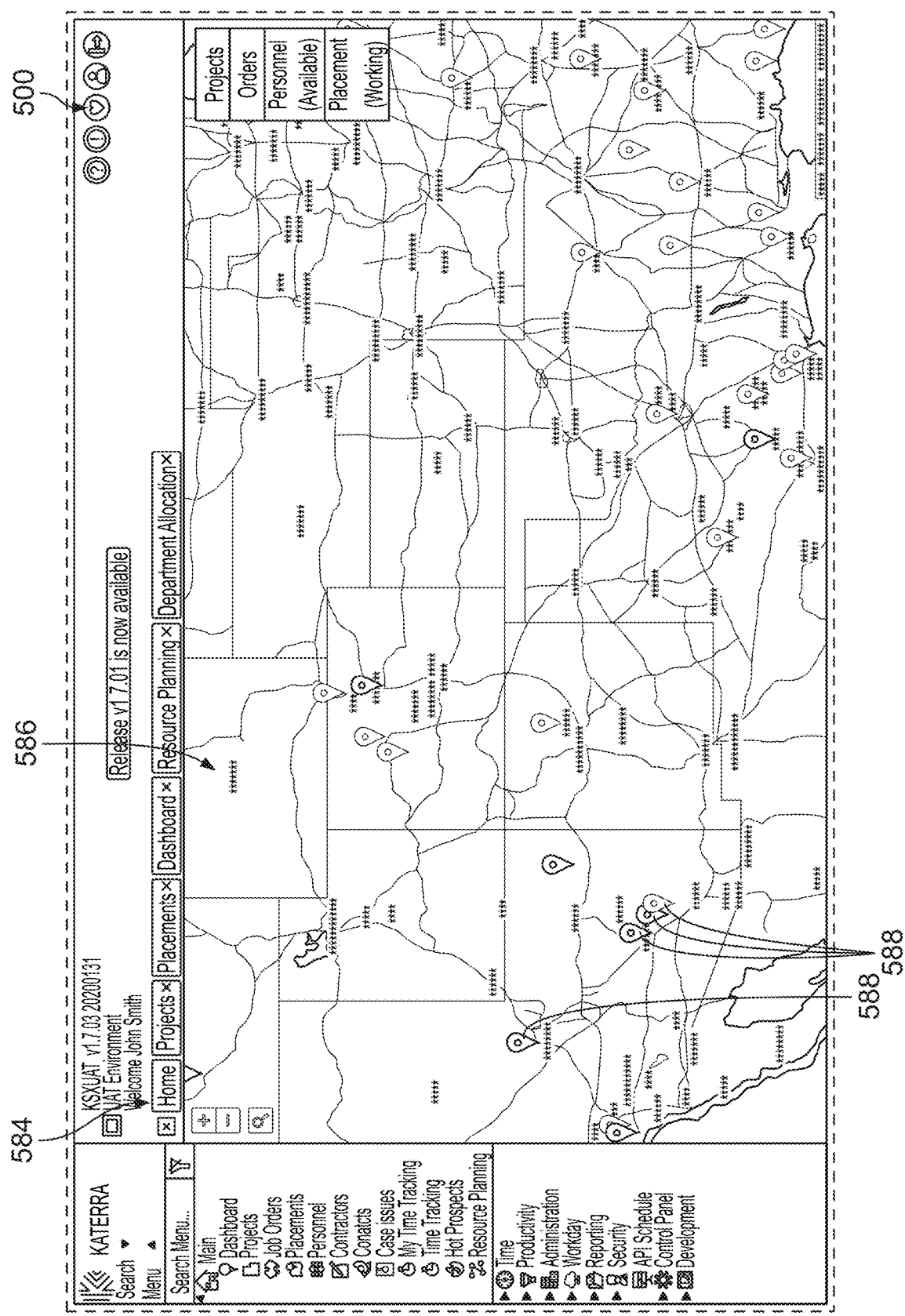

FIGS. 22 and 23 are illustrations of a "Project" window 584 of the user interface 500 including a geographical map 586. The "Project" window 584 may be used as a dashboard or landing spot where a user is able to select one of the multi-task projects to navigate to the respective "Project Summary" window 554 (shown in FIG. 6). The map 586 includes geographic locations 588 of multi-task projects. As shown in FIG. 22, a user may view a project task list 589 by selecting or pointing to a location 588 of the respective project on the map 586. The project task list 589 may include task status and performance data, if available, for the task. The project task list may also indicate if there are any unassigned tasks for the project and include the trade designations for the tasks.

Figure 24:
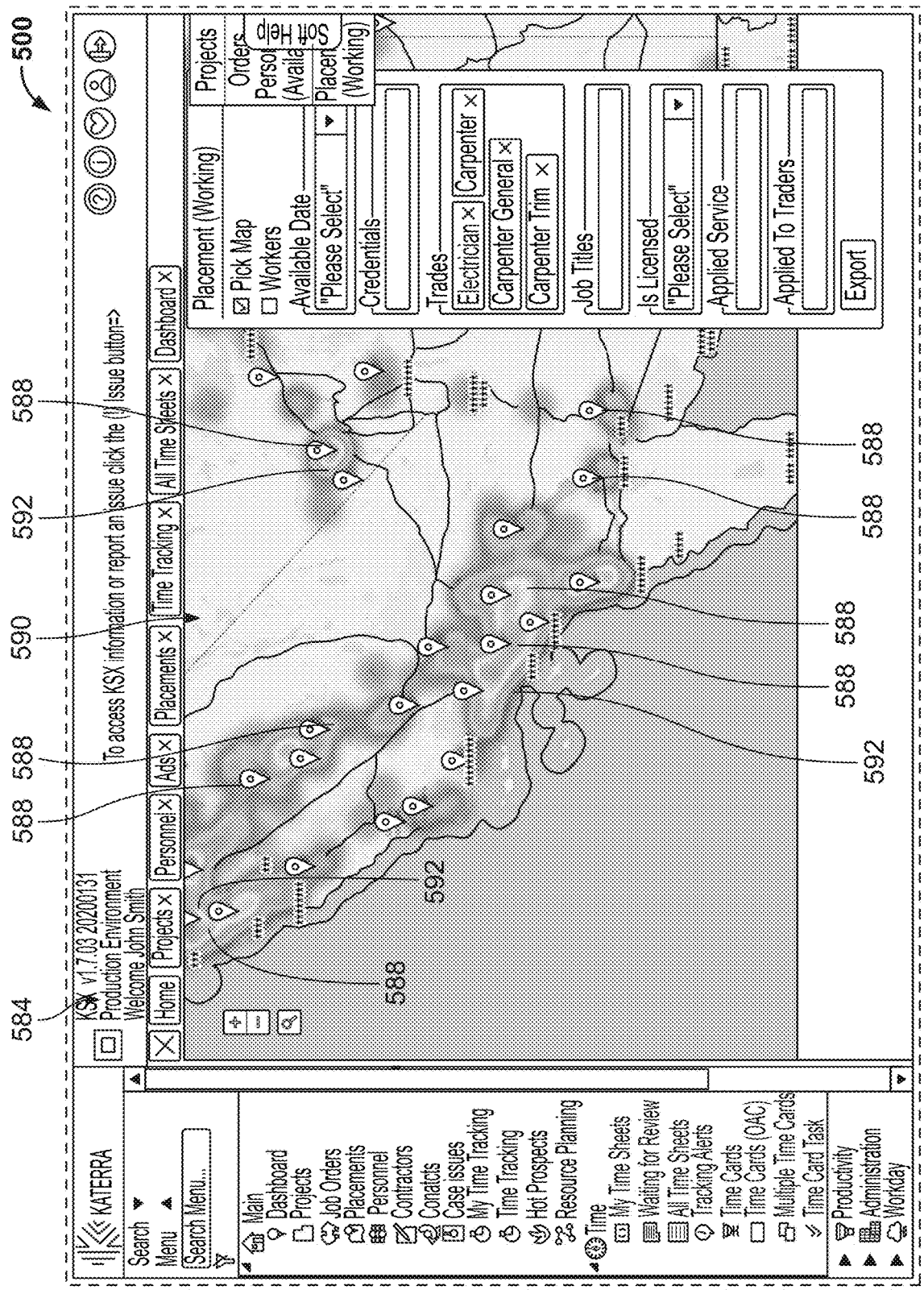
FIG. 24 is an illustration of a "Project" window of the user interface shown in FIG. 5, including a geographical map and workforce highlighting.

FIG. 24 is an illustration of the "Supply and Demand Dashboard" window 584 of the user interface 500. The "Supply and Demand Dashboard" window 584 provides information relating to project locations, job orders of any status (open, filled, closed), and/or workers. The information may be sorted using filters. For example, job orders may be sorted by status (e.g., open, filled, closed). Worker information may be sorted according to availability status (e.g., available, unavailable, will become available), skill or trade, credentials, location, etc. In the exemplary embodiment, "Supply and Demand Dashboard" window 584 includes a geographical map 590 with highlighting 592 to indicate locations of available workers. The map 590 allows for the comparison of project locations 588 and locations of available workers. In particular, the illustrated geographical map 590 is in the form of a heat map where areas are highlighted with different colors based on the concentration of available workers. Accordingly, the map 590 may facilitate selecting projects within or proximate to areas that are indicated as having a higher concentration of available, qualified workers.

Figure 25:
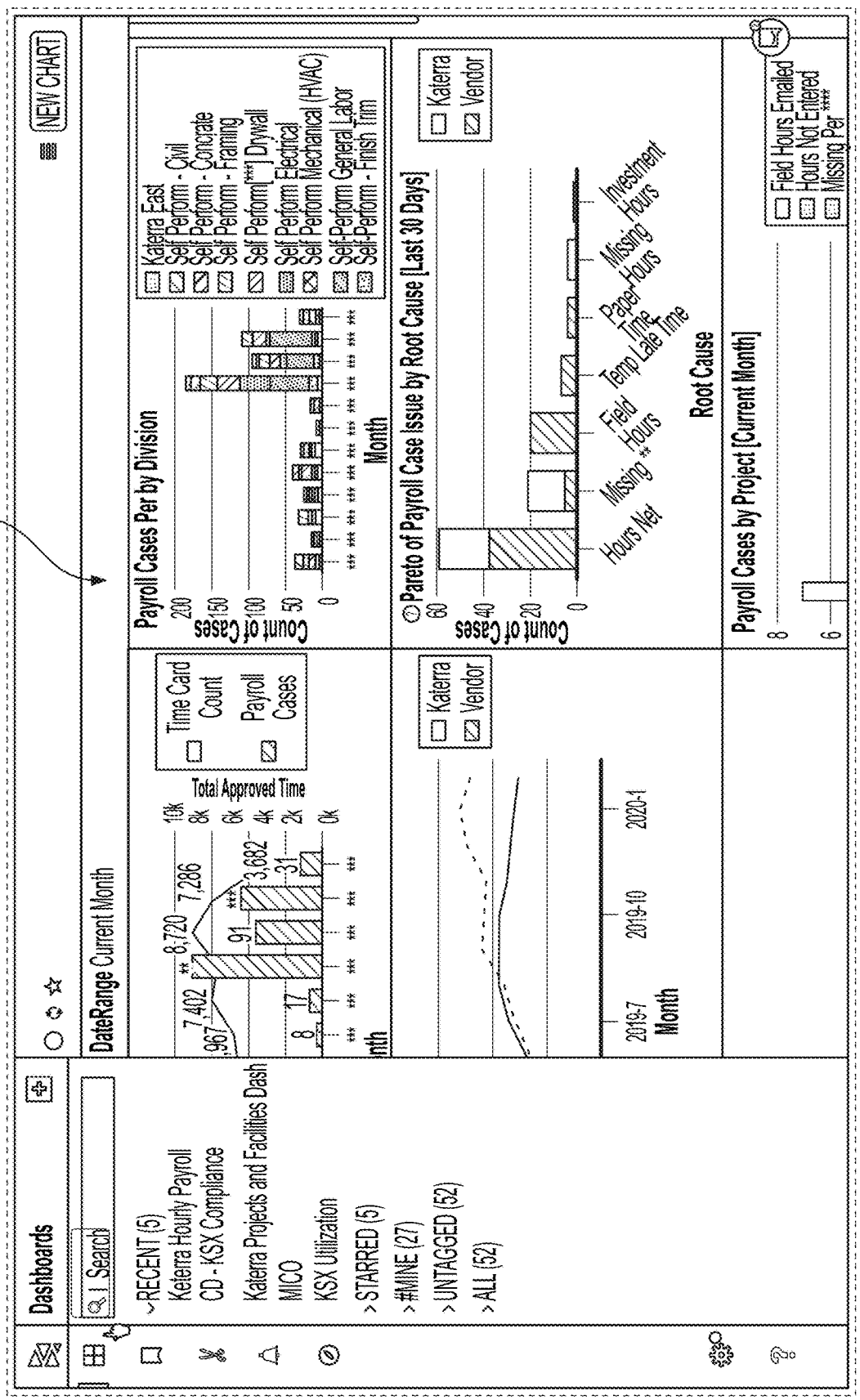
FIG. 25 is an illustration of an exemplary report including data from the system shown in FIG. 2.

FIG. 25 is an illustration of an exemplary report 602 using data from the system shown in FIG. 2. The report 602 may be generated using the user interface 500 or a reporting application. The report 602 may be accessed using a network connection (i.e., "online") or without a network connection (i.e., "offline"). The report 602 provides graphs and charts in a manner that is simple for a user to interpret. The report 602 may be customizable such that a user can select which data, charts, displays, etc. to view. Accordingly, the report 602 allows a user to focus on pertinent information for different functions. The report 602 may be generated for a single project or a plurality of projects. The report 602 may include financial, schedule, estimate, and performance data. In addition, the report 602 may enable a user to compare estimated or budget values to actual values. Moreover, the report 602 and the system 200 (shown in FIG. 2) allow aggregation of costs of all personnel for a single or multiple multi-task projects. In addition, the report 602 can include data for labor productivity for one or more multi-task projects and the labor productivity may be broken down by task and individual workers.

As will be appreciated based on the foregoing specification, the above-described embodiments of the disclosure may be implemented using computer programming or engineering techniques including computer software, firmware, hardware or any combination or subset thereof, wherein the technical effect is to provide virtualization and fraud security around fundraising and redemption in an online payment transaction environment. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A construction scheduler for a multi-task construction project, the construction scheduler including at least one processor in communication with at least one memory device, the at least one processor is programmed to:
store, in the memory, at least one task code and a workforce requirement for each task of the multi-task construction project, wherein the task code relates each task to at least one construction activity;

build, by the processor, a task schedule for the multi-task construction project, wherein the task schedule includes for each task:
workhours;
a projected time frame; and
functions;

generate job orders based on the task schedule, wherein each task is associated with at least one job order;

retrieve, by the processor, availability data for persons qualified for the functions of each task, wherein the availability data for each person includes an availability status and a geographic location;

build, by the processor, a construction work schedule by assigning persons to the job orders based on:
the task schedule;
the availability status;
the geographic locations; and
a project location;

cause, by the processor, the construction work schedule to be displayed on a user interface, wherein the user interface is configured to receive input related to the construction schedule from a user;

identify, by the processor, the construction activity for each task performed by the assigned persons based on the task code of the task;

receive, by the processor in real-time, performance data for the construction activity performed by each assigned person;

store, in the memory, the task code and the performance data for the construction activity performed by each assigned person;

update, by the processor in real-time, the construction work schedule based upon the performance data;

cause, by the processor, the updated construction work schedule to be displayed on the user interface, wherein the display includes a plurality of icons that allow the user to navigate the updated construction work schedule;

re-configure, by the processor, the updated construction work schedule to be displayed on the user interface based on an icon of the plurality of icons being selected by the user; and generate a recommendation for a future assignment of at least one person for a construction activity based on the updated construction work schedule.

2. A construction scheduler of claim 1, wherein the input includes a search request for at least one person based on the construction work schedule.

3. A construction scheduler of claim 1, wherein the performance data includes a completed time frame for the construction activity, the processor further configured to compare the completed time frame to the projected time frame in the task schedule and provide an alert if a difference between the completed time frame and the projected time frame is greater than a threshold value.

4. A construction scheduler of claim 1, wherein the processor is further configured to send an alert to the user interface if at least one role in the task schedule does not include an assigned person.

5. A construction scheduler of claim 1, wherein the processor is further configured to compare each worker location to the project location prior to assigning the respective person to a role for the project.

6. A construction scheduler of claim 5, wherein the processor is configured to compare each geographic location to the project location by generating a geographical map including the project location and the geographic locations.

7. A construction scheduler of claim 5, wherein the processor is further configured to receive the geographic locations from mobile devices correlated with the persons.

8. A construction scheduler of claim 1, wherein the task codes are selected to represent the task based on a code system that associates codes and activities.

9. A method for generating a work schedule for a multi-task construction project using a construction work scheduling (CWS) computing device having a processor in communication with a memory, the method comprising:

storing, in the memory, a task code and a labor requirement for each task of the multi-task construction project, wherein the task code relates each task to at least one construction activity;

building, by the processor, a task schedule for the multi-task construction project, wherein the task schedule includes for each task:
labor hours;
a projected time frame; and
worker roles;

generating, by the processor, job orders based on the task schedule, wherein each task is associated with at least one job order;

retrieving, by the processor, availability data for workers qualified for the worker roles of each task, wherein the availability data for each worker includes an availability status and a worker geographic location;

building, by the processor, the work schedule by assigning workers to the job orders based on:
the task schedule;
the worker availability data;
the worker geographic locations; and
a project location;

causing, by the processor, the construction work schedule to be displayed on a user interface, wherein the user interface is configured to receive input related to the construction schedule from a user;

identifying, by the processor, the construction activity for each task performed by the assigned persons based on the task code of the task;

receiving, by the processor in real-time, performance data for the construction activity performed by each assigned person;

storing, in the memory, the task code and the performance data for the construction activity performed by each assigned person;

updating, by the processor in real-time, the construction work schedule based upon the performance data;

causing, by the processor, the updated construction work schedule to be displayed on the user interface, wherein the display includes a plurality of icons that allow the user to navigate the updated construction work schedule;

re-configuring, by the processor, the updated construction work schedule to be displayed on the user interface based on an icon of the plurality of icons being selected by the user; and generating a recommendation for a future assignment of at least one person for a construction activity based on the updated construction work schedule.

10. A method of claim 9, wherein the user interface is configured to:
display the work schedule for interpretation by the user.

11. A method of claim 9, wherein the assigned workers perform a construction activity for each task, the method further comprising tracking performance data for the construction activity performed by each assigned worker and storing the performance data in the memory.

12. A method of claim 11, wherein the performance data includes a completed time frame for the construction activity, the method further comprising comparing the completed time frame to the projected time frame in the task schedule and providing an alert if a difference between the completed time frame and the projected time frame is greater than a threshold value.

13. A method of claim 9, further comprising sending an alert to a user interface if at least one role in the task schedule has not been filled by an assigned worker.

14. A method of claim 9, further comprising comparing each worker location to the project location prior to assigning the respective worker to the job order.

15. A method of claim 14, wherein comparing each worker location to the project location comprises generating a geographical map including the project location and the worker locations.

16. A method of claim 14, further comprising receiving the worker locations from mobile devices correlated with the workers.

17. A method of claim 9, wherein the task codes are selected to represent the task based on a code system that associates codes and activities.

* * * * *